US009501061B2

(12) United States Patent
Canoy et al.

(10) Patent No.: US 9,501,061 B2
(45) Date of Patent: Nov. 22, 2016

(54) NEAR-FLIGHT TESTING MANEUVERS FOR AUTONOMOUS AIRCRAFT

(71) Applicant: QUALCOMM Incorporated, San Diego, CA (US)

(72) Inventors: Michael-David Nakayoshi Canoy, San Diego, CA (US); Kiet Tuan Chau, San Diego, CA (US); Stephen Alton Sprigg, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 14/643,017

(22) Filed: Mar. 10, 2015

(65) Prior Publication Data

US 2016/0246304 A1   Aug. 25, 2016

Related U.S. Application Data

(60) Provisional application No. 62/119,838, filed on Feb. 24, 2015.

(51) Int. Cl.
 G05D 1/08 (2006.01)
 G05D 1/00 (2006.01)
 G05D 1/10 (2006.01)

(52) U.S. Cl.
 CPC .......... *G05D 1/0816* (2013.01); *G05D 1/0011* (2013.01); *G05D 1/101* (2013.01);
 (Continued)

(58) Field of Classification Search
 None
 See application file for complete search history.

(56) References Cited

U.S. PATENT DOCUMENTS 3,656,723 A   4/1972   Piasecki et al.
3,985,320 A   10/1976  Brady
(Continued)

FOREIGN PATENT DOCUMENTS

CN   104176247 A   12/2014
DE   102005012744 A1   4/2006
(Continued)

OTHER PUBLICATIONS

Pounds P.E.I., et al., "Stability of small-scale UAV helicopters and quadrotors with added payload mass under PID control," Auton Robot, 2012, vol. 33, pp. 129-142.
(Continued)

*Primary Examiner* — Russell Frejd
(74) *Attorney, Agent, or Firm* — The Marbury Law Group, PLLC

(57) ABSTRACT

Methods, devices, systems, and non-transitory process-readable media for evaluating operating conditions of an autonomous aircraft before performing a mission by executing brief near-flight testing maneuvers at a low elevation. A processor of the autonomous aircraft may receive near-flight testing maneuver instructions that indicate a near-flight testing maneuver to be executed by the autonomous aircraft. The processor may control motors to cause the aircraft to execute a near-flight testing maneuver within a testing area, obtain data indicating stability and performance information while executing the near-flight testing maneuvers, and take an action in response to the obtained data. Actions may include adjusting a position of a payload, a weight, or a portion of the aircraft based on the obtained data, and adjusting a flight plan. The near-flight testing maneuvers may include a sequence of moves for testing stability of the aircraft and payload executing a flight path under anticipated flying conditions.

46 Claims, 8 Drawing Sheets

(52) U.S. Cl.
CPC .... *B64C2201/027* (2013.01); *B64C 2201/042* (2013.01); *B64C 2201/128* (2013.01); *B64C 2201/145* (2013.01)

(56) References Cited

U.S. PATENT DOCUMENTS

| | | | |
|---|---|---|---|
| 5,115,996 A | 5/1992 | Moller | |
| 6,119,976 A | 9/2000 | Rogers | |
| 6,533,220 B2 | 3/2003 | Schuster | |
| 7,364,114 B2 | 4/2008 | Wobben | |
| 8,000,849 B2 * | 8/2011 | Reich | B64C 13/20 701/10 |
| 8,109,802 B2 | 2/2012 | Chui et al. | |
| 8,205,822 B1 | 6/2012 | Jameson et al. | |
| 8,292,215 B2 | 10/2012 | Olm et al. | |
| 8,353,199 B1 | 1/2013 | Ma et al. | |
| 8,622,336 B2 | 1/2014 | Brenner et al. | |
| 8,721,383 B2 | 5/2014 | Woodworth et al. | |
| 8,794,566 B2 | 8/2014 | Hutson | |
| 8,931,730 B2 | 1/2015 | Wang et al. | |
| 9,061,763 B1 | 6/2015 | Christensen et al. | |
| 9,199,733 B2 | 12/2015 | Keennon et al. | |
| 9,205,922 B1 | 12/2015 | Bouwer | |
| 9,272,784 B2 | 3/2016 | Nelson | |
| 2002/0184965 A1 | 12/2002 | Honda | |
| 2006/0226281 A1 | 10/2006 | Walton | |
| 2006/0228105 A1 | 10/2006 | Chapman | |
| 2007/0145182 A1 * | 6/2007 | Page | B64C 39/024 244/63 |
| 2009/0114773 A1 | 5/2009 | Helou, Jr. | |
| 2009/0134273 A1 | 5/2009 | Page et al. | |
| 2009/0283629 A1 | 11/2009 | Kroetsch et al. | |
| 2009/0299551 A1 | 12/2009 | So et al. | |
| 2010/0278656 A1 | 11/2010 | Taya | |
| 2011/0002785 A1 | 1/2011 | Cawthorne et al. | |
| 2011/0139928 A1 | 6/2011 | Morris et al. | |
| 2012/0032025 A1 | 2/2012 | Allen et al. | |
| 2012/0221291 A1 | 8/2012 | Han et al. | |
| 2012/0298793 A1 | 11/2012 | Weddendorf et al. | |
| 2013/0206915 A1 | 8/2013 | Desaulniers | |
| 2014/0064978 A1 | 3/2014 | Somenzini | |
| 2014/0217230 A1 | 8/2014 | Helou, Jr. | |
| 2014/0316616 A1 | 10/2014 | Kugelmass | |
| 2015/0014475 A1 | 1/2015 | Taylor et al. | |
| 2015/0032297 A1 | 1/2015 | Loewen et al. | |
| 2015/0136897 A1 | 5/2015 | Seibel et al. | |
| 2015/0336671 A1 | 11/2015 | Winn et al. | |
| 2016/0039541 A1 | 2/2016 | Beardsley et al. | |
| 2016/0059958 A1 | 3/2016 | Kvitnevskiy | |

FOREIGN PATENT DOCUMENTS

| | | |
|---|---|---|
| EP | 1901153 A1 | 3/2008 |
| GB | 2270510 A | 3/1994 |
| GB | 2455374 A | 6/2009 |

OTHER PUBLICATIONS

International Search Report and Written Opinion—PCT/US2016/012838—ISA/EPO—Apr. 28, 2016.

\* cited by examiner

NEAR-FLIGHT TESTING MANEUVERS FOR AUTONOMOUS AIRCRAFT

RELATED APPLICATIONS

This application claims the benefit of priority to U.S. Provisional Patent Application No. 62/119,838, entitled "Near-flight Testing Maneuvers for Autonomous Aircraft" filed Feb. 24, 2015, the entire contents of which are hereby incorporated herein by reference.

BACKGROUND

Pre-flight checks are often performed by flight crews to verify that conventional aircraft are safe to fly prior to taking off. For example, crews of commercial airplanes may perform pre-flight checks of various structures and systems to confirm the aircraft is functional and adequately safe for flight. As part of such pre-flight checks, the center-of-gravity (CG) of an aircraft is typically calculated based upon the weight and placement of payload within the aircraft, such as passengers and cargo. CG calculations are typically static calculations that are often done by humans. Other checks may also be performed, such as power or engine status based on battery charge levels or motor run life. Based on such calculations during pre-flight checks, the payload may be repositioned and passengers may be moved to different seats while the aircraft is on the ground so that the CG is adjusted to promote stable, safe flight.

The use of affordable autonomous aircraft (e.g., aerial drones) is rapidly increasing, and thus the likelihood of commercial shipping via autonomous aircraft is becoming increasingly more likely. In particular, autonomous aircraft may be used for shipping payloads, such as boxes or small items from warehouses or distribution centers to recipients. Since the configuration of a payload may significantly affect the CG and thus the stability of autonomous aircraft, CG management is an important consideration for autonomous aircraft. For example, the CG of a drone carrying a box for delivery can be affected by how the box or the items within the box are positioned with respect to the drone.

SUMMARY

Various embodiments provide methods, devices, systems, and non-transitory process-readable storage media for improving the operation of autonomous aircraft by executing brief near-flight testing maneuvers to evaluate factors related to airworthiness and stability. An embodiment method performed by a processor of an autonomous aircraft may include operations for controlling motors of the autonomous aircraft to cause the autonomous aircraft to execute an airborne near-flight testing maneuver within a testing area, obtaining data indicating performance information while executing the near-flight testing maneuver, and taking an action responsive to the obtained data. In some embodiments, the method may further include obtaining near-flight testing maneuver instructions that indicate the near-flight testing maneuver to be executed by the autonomous aircraft, may include downloading the near-flight testing maneuver instructions from a remote server, and/or receiving the near-flight testing maneuver instructions based on a user input from a human operator. In some embodiments, the near-flight testing maneuver may be a sequence of airborne maneuvers including one or more of a tilt, a turn, a jerk, a change in altitude, a rotation, a shake, or a test path.

In some embodiments, obtaining the data indicating the performance information while executing the near-flight testing maneuver may include receiving and processing sensor data from on-board sensors of the autonomous aircraft. In some embodiments, the on-board sensors may include one or more of a gyroscope, an accelerometer, a camera, and an altimeter.

In some embodiments, the autonomous aircraft may be configured to carry a payload, and taking the action responsive to the obtained data may include controlling a payload mechanism to adjust a position of the payload based on the obtained data. In some embodiments, controlling the payload mechanism to adjust the position of the payload based on the obtained data may include sending a signal to a component of the autonomous aircraft to move ballast, a weight, or the payload. In some embodiments, the component may be one of an actuator, a motor, and a belt.

In some embodiments, taking the action responsive to the obtained data may include re-configuring a flight parameter of the autonomous aircraft based on the obtained data, which may be one or more of a speed, an altitude, and a power usage. In some embodiments, the power usage may indicate an acceptable amount of battery discharge or fuel consumption for a period of time.

In some embodiments, taking the action responsive to the obtained data may include transmitting a message reporting the obtained data to a remote computing device (e.g., a remote control device on the ground), which may include a request permission for the autonomous aircraft to conduct a flight plan.

In some embodiments, the method may further include obtaining data indicating a flight plan and flight conditions associated with the flight plan, and determining whether the autonomous aircraft may be airworthy and/or stable enough for the flight plan and the flight conditions based on the obtained data. In some embodiments, taking the action responsive to the obtained data may include re-configuring a flight parameter of the autonomous aircraft in response to determining that the autonomous aircraft is not airworthy or stable enough for the flight plan and the flight conditions, and controlling a payload mechanism to adjust a position of the payload in response to determining that the autonomous aircraft with the payload is not airworthy or stable enough for the flight plan and the flight conditions. In some embodiments, taking the action responsive to the obtained data may include controlling the motors of the autonomous aircraft to cause the autonomous aircraft to execute a landing in response to determining that the autonomous aircraft is not airworthy or stable enough for the flight plan and the flight conditions based on the obtained data, and controlling the motors of the autonomous aircraft to cause the autonomous aircraft to execute the flight plan in response to determining that the autonomous aircraft is airworthy and stable enough for the flight plan and the flight conditions based on the obtained data. In some embodiments, the flight plan may include information about characteristics of a payload, which may include one or more of a payload type, dimensions, a weight, and a priority. In some embodiments, the flight conditions may include real-time data or historic data of one or more of weather, traffic, and geography.

In some embodiments, the method may further include adjusting the near-flight testing maneuver based on the obtained flight plan and the flight conditions data, which may include adding an airborne maneuver to, removing the airborne maneuver from, or modifying the airborne maneuver within a sequence of airborne maneuvers.

In some embodiments, taking the action responsive to the obtained data may include re-configuring the flight plan, such as by include adding, removing, or modifying a waypoint, in response to determining that the autonomous aircraft is not airworthy or stable enough for the flight plan and the flight conditions.

In some embodiments, controlling the motors of the autonomous aircraft to cause the autonomous aircraft to execute the airborne near-flight testing maneuver within the testing area may include controlling the motors of the autonomous aircraft to cause the autonomous aircraft to execute the airborne near-flight testing maneuver within the testing area at an elevation that will avoid damage to a human or equipment if the autonomous aircraft becomes unstable.

Further embodiments include drone having a processor configured with processor-executable instructions for performing operations of the methods described above. Further embodiments include a non-transitory processor-readable medium on which is stored processor-executable instructions configured to cause a drone processor to perform operations of the methods described above. Further embodiments include a communication system including a processor configured with processor-executable instructions to send signals to a drone to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The word "exemplary" is used herein to mean "serving as an example, instance, or illustration." Any implementation described herein as "exemplary" is not necessarily to be construed as preferred or advantageous over other implementations.

The terms "drone" and "autonomous aircraft" are used herein to refer to various types of vehicles that are capable of autonomous flight and that include at least a processing unit for controlling flight of the vehicle according to stored instructions (e.g., data indicating a predetermined flight plan, etc.). Autonomous aircraft include unmanned aircraft that are capable of flying without any human interaction, with some human interaction (e.g., providing flight instructions to be executed by the processing unit), under partial human control, and under full human control (e.g., during take-off and landings.) As examples, autonomous aircraft may include aerial drones or "unmanned aerial vehicles" (or UAVs). Autonomous aircraft may be of various design types capable of executing vertical lift-offs, such as helicopter-type drones configured with any number of rotors (e.g., quad-copter drones having four rotors, etc.). Although autonomous aircraft may be selectively controlled by human operators, autonomous aircraft may be capable of independently performing at least a series of instructions, commands, and/or routines for testing flight stability as described herein. An autonomous aircraft includes a control system including a processor for executing processor-executable instructions for controlling the various functionalities of the autonomous aircraft, such as communications (e.g., wireless signaling via Wi-Fi®, Bluetooth®, Long Term Evolution (LTE), etc.), data collection (e.g., polling sensors, etc.), propulsion/navigation, power management, and stability management (e.g., calculating center-of-gravity, etc.). Autonomous aircraft may or may not be configured to carry payloads during missions, such as surveillance drones configured merely to travel to various locations in order to capture camera imagery or delivery drones configured to drop-off packages to a destination address and return to an address of origin.

Figure 5:
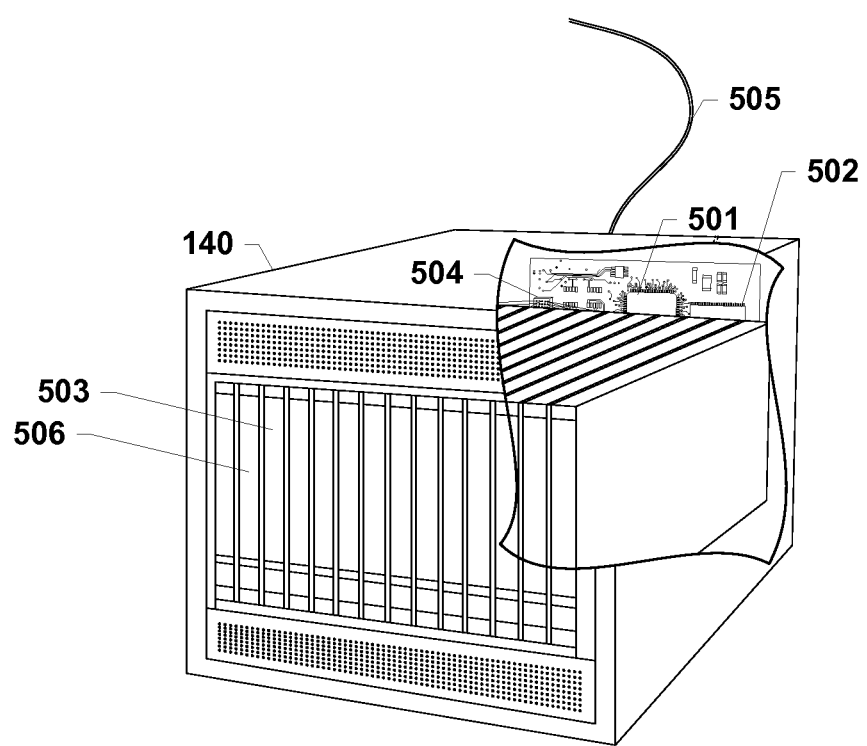
FIG. 5 is a component block diagram of a server computing device suitable for use in some embodiments.

The terms "server" and "server computing device" are used to refer to any computing device capable of functioning as a server, such as a master exchange server, web server, and a personal or mobile computing device configured with software to execute server functions (e.g., a "light server"). A server may be a dedicated computing device or a computing device including a server module (e.g., running an application that may cause the computing device to operate as a server). A server module (or server application) may be a full function server module, or a light or secondary server module (e.g., light or secondary server application). A light server or secondary server may be a slimmed-down version of server type functionality that can be implemented on a personal or mobile computing device, such as a smart phone, thereby enabling it to function as an Internet server (e.g., an enterprise e-mail server) to a limited extent, such as necessary to provide the functionality described herein. An example of server suitable for use with the various embodiments is described with reference to FIG. 5.

The various embodiments provide methods, devices, systems, and non-transitory process-readable storage media for improving the operation of autonomous aircraft by executing brief near-flight testing maneuvers to evaluate factors that may impact the aircraft's ability to safely and successfully move (referred to generally as "airworthiness" and/or stability), such as by evaluating the aircraft's stability in flight just after lift off, vibration, rotor speeds, etc. In general, an autonomous aircraft may be configured to lift off a small distance (e.g., a few inches, a few feet, etc.) from the ground, such within a pre-flight testing areas or pad, at the start of a testing routine. For example, the autonomous aircraft may lift-off a few inches and establish a level hovering by controlling the power applied to each rotor with a flight control system. In such a near-flight configuration, the flight control system may monitor accelerometers and gyroscopes to measure various steady flight stability and balance characteristics, such as weight and balance. For example, by measuring the power applied to the rotors necessary to lift off, the flight control system may determine the weight or lift margin of the aircraft. As another example, by applying the same power to each rotor and then measuring any rotation of the aircraft through gyroscope sensors, the flight control system may determine whether the weight distribution or location of the CG are within flight stability limits.

While in the air during the testing routine, the autonomous aircraft may also execute a series of "near-flight testing maneuvers" (or "airborne near-flight testing maneuvers") in order to determine the dynamic stability of the aircraft. In such near-flight testing maneuvers, the flight control system may cause the aircraft to move in different ways (e.g., tilts and jerks, etc.) in order to stress, shake, accelerate or otherwise place the aircraft under conditions that will test the dynamic stability of the autonomous aircraft and any payload it may be configured to carry. For example, after lifting off a few inches, the autonomous aircraft may perform a series of pre-programmed tilts, mid-air jerking movements, and/or flying a short test path while remaining close to the lift-off location. The autonomous aircraft may take various stability measurements (e.g., using accelerometers, gyroscopes and the power applied to each rotor) during these near-flight testing maneuvers and determine whether the stability of the aircraft is adequate for flight, with or without a payload. For example, the autonomous aircraft may measure the power applied to each rotor by the flight control system while maintaining level flight and compare the applied power or differences across the rotors to predefined default values (e.g., typical power applied to the rotors without the payload) or stability thresholds to determine whether the CG of the autonomous aircraft is properly positioned and stable enough for safe flight. With such near-flight actions, the autonomous aircraft may make various adjustments to improve the ability of the autonomous aircraft to successfully carry out a mission, such as by improving CG prior to committing to a flight plan and/or evaluating the airworthiness of the aircraft before takeoff to ensure that the autonomous aircraft will remain airworthy for the duration of a flight mission.

In some embodiments, the autonomous aircraft may use the near-flight testing maneuvers to evaluate the impact of fuel distribution within the airframe on the stability of the autonomous aircraft. For example, the autonomous aircraft may execute an airborne near-flight testing maneuver within a testing area to determine how various levels of fuel (e.g., full, half-full, and near-empty) within one or more fuel tanks will affect the stability of the aircraft during an extended mission. In this way, the impact on flight stability of shifts or movements of fuel that occur during an extended mission may be assessed. In some embodiments, the autonomous aircraft may be configured to estimate the rate of fuel consumption based on the near-flight testing maneuvers, and based on such calculations, determine the adequacy of fuel reserves for a particular flight plan and/or identify how stability may be affected as fuel is consumed during the flight.

In various embodiments, the autonomous aircraft may be configured to obtain and assess information from a variety of sensors to determine various conditions relevant to the ability of the autonomous aircraft to successfully fly (e.g., in-flight stability and/or airworthiness), such as the CG and the movement of the payload. The autonomous aircraft may continually measure stability parameters during the near-flight testing maneuvers to determine whether the payload could shift during an actual flight plan, causing unsafe changes to the CG of the autonomous aircraft. For example, the autonomous aircraft may analyze image data from a camera (e.g., imagery of horizon), as well as data from a flight control gyroscope (e.g., pitch, roll, tilt, etc.), and accelerometers in order to determine whether the autonomous aircraft is flying level and/or whether the forces on the autonomous aircraft are within safe flight parameters. As another example, the autonomous aircraft may compare the power applied to each of the rotor motors to detect imbalances and/or calculate CG.

Based on the obtained and analyzed data, the autonomous aircraft may determine whether the autonomous aircraft has adequate conditions (e.g., stability, CG, fuel reserves, etc.) for a safe and successful flight. For example, the autonomous aircraft may compare the obtained information to predefined threshold values that indicate safe or acceptable operating parameters for flying with or without a payload. In some embodiments, the autonomous aircraft may estimate fuel or power consumption for a future flight plan based on the testing, such as by determining whether additional torque that must be applied to one or two rotors to maintain level flight will drain the battery too quickly to complete the flight plan.

The autonomous aircraft may be configured to perform various corrective functions in response to determining the aircraft is likely not configured to conduct a successful flight (e.g., there is not adequate stability for flight with or without a payload). For example, the autonomous aircraft may download from an associated server a new control or configuration for operating based on the near-flight testing results. As another example, the autonomous aircraft may control an actuator to shift the location of a payload on the aircraft frame and/or move ballast or counter weight via a rail on the autonomous aircraft chassis in response to determining that the CG of the autonomous aircraft is out of position. In some embodiments, such corrective measurements may require that the autonomous aircraft adjust subsystems or flight parameters beyond typical specifications. For example, the autonomous aircraft may identify a reconfiguration (or recalculation) for power distribution for controlling rotors or flight control algorithms to better handle a payload (e.g., more power to a particular engine, adjusting toque on a particular motor, etc.). In some embodiments, if the autonomous aircraft determines that no reconfigurations or adjustments can be made to enable safe flight with sufficient endurance for a flight plan, the flight plan or the mission may be aborted.

In some embodiments, the autonomous aircraft may be configured to evaluate various conditions, characteristics, functionalities, and other metrics during near-flight testing maneuvers, such as any factors that may affect airworthiness (e.g., engine time before overhaul (TBO), rotor speeds, etc.). For example, the autonomous aircraft may evaluate the power draw on batteries, the fuel usage, and/or the processing toll that may be incurred during particular airborne actions (e.g., rolls, banking, etc.). Such additional information may be used by the autonomous aircraft to evaluate the likelihood of successfully completing a flight plan (or travel route). For example, the autonomous aircraft may compare a current calculation estimating battery drain during near-flight testing maneuvers to the estimated movements required during a delivery flight plan to determine whether there is currently enough battery power (i.e., charge level) or fuel reserves to successfully complete an assigned mission. As another example, the autonomous aircraft may evaluate a motor run life (i.e., hours) to identify how performance may be impacted, such as whether a delivery mission may fail mid-mission due to motor failure. As another example, the autonomous aircraft may evaluate current engine TBO with regard to an estimated time for an upcoming flight plan and/or power usage and/or speed to identify whether the aircraft may become un-airworthy with regard to pre-established standards (e.g., Federal Aviation Regulations (FAR)). Based on such evaluations, the autonomous aircraft may re-configure flight parameters (e.g., re-route or change a flight plan, change speed during a flight plan, etc.) and/or transmit messages to improve operating situations (e.g., transmit a message requesting a battery charge, more fuel, re-assignment to an easier delivery route, etc.).

In some embodiments, the autonomous aircraft may be configured to exchange wireless messages with other devices in order to communicate observed issues impacting the ability to conduct a successful flight (e.g., issues with CG and/or payloads, etc.) as well as to receive inputs from operators (e.g., mission control). Messages from the autonomous aircraft to human operators may include recommendations for correcting the CG, such as messages indicating how payloads or weights should be re-configured in order to improve CG. For example, the autonomous aircraft may send a message indicating that human flight crew members should move the payload to another section or position on the autonomous aircraft. As another example, when the payload is especially important (e.g., a medical product/vaccine, etc.) and the measured CG is nominally outside of a prescribed threshold, the autonomous aircraft may request permission to override usual flight protocols and proceed with a flight plan.

In some embodiments, the autonomous aircraft may also perform stability testing during normal flight (i.e., post take-off). For example, while executing a predetermined flight plan, the autonomous aircraft may monitor sensors and power applied to each rotor to estimate the location of the CG and make adjustments to flight parameters to improve stability in response to such measurements. Such monitoring of sensors and rotor power may be accompanied with performance of some flight actions to test flight stability. As another example, the autonomous aircraft may monitor real-time imagery from an on-board camera, acoustics data from a microphone, and/or readings from a laser to improve stability and flight path safety. Such mid-air testing of stability parameters may be performed on a regular interval or in response to various triggers (e.g., turbulence indicated by sensor data). Based on the mid-air testing, the autonomous aircraft may perform various actions to adjust CG if needed, such as by shifting internal counter-balances by controlling associated motors and/or changing values used by flight control algorithms to accommodate for CG changes (e.g., provide greater power to a particular engine, etc. In some embodiments, other tests may be performed by the autonomous aircraft in flight in order to verify other systems, such as control surfaces, motors, aerodynamics, etc.

In some embodiments, the near-flight testing area may be configured to simulate flight conditions to provide the autonomous aircraft with more useful information based on the near-flight testing maneuvers. For example, the autonomous aircraft may execute near-flight testing maneuvers within a wind tunnel or in an outside area to encounter environmental effects, such as rain, etc. In some embodiments, mechanisms such as wind tunnels or moveable surfaces may be employed to assert various forces, movements, and/or testing circumstances on the autonomous aircraft to enable various sensors to obtain information that may indicate the aircraft's airworthiness and/or other operating conditions (e.g., CG within an acceptable envelope, vibrations, rotor speeds, etc.). For example, an autonomous aircraft may be installed on a staging platform that is configured to be tilted in various directions via hydraulics. Based on a series of movements by the staging platform, the autonomous aircraft may gather stability information from on-board sensors without requiring an airborne near-flight testing maneuver.

When used in conjunction with to conventional pre-flight checks performed on the ground (e.g., an initial CG assessment, testing whether subsystem are online and functioning properly, etc.), the embodiment near-flight testing maneuvers may improve the resource use and success of flight plans by autonomous aircraft carrying payloads. By testing stability in the air with near-flight testing motions, the autonomous aircraft implementing embodiment techniques may simulate turbulence and other in-flight conditions that may not be known through static stability checks, and do so within the safe confines of the near-flight testing area. For example, shifting items within a payload box may be identified with jerking maneuvers, enabling the autonomous aircraft to adjust the assigned flight plan to avoid flying conditions similar to the jerking movements that would reduce fuel efficiency. In this manner, the embodiment techniques may be used to proactively correct in-flight issues related to a shifting CG due to movements in payloads.

In some embodiments, the airworthiness and/or stability may be evaluated via near-flight testing maneuvers at a plurality of stages of a flight plan. In particular, in addition to performing near-flight testing maneuvers prior to take-off for a mission, the autonomous aircraft may also be configured to perform a second set of near flight maneuvers at a destination location prior to embarking on a return trip to the point of origin. For example, once the autonomous aircraft drops off a package at a customer's house, the autonomous aircraft may perform another near-flight test to evaluate the capabilities of the autonomous aircraft without the payload, such as a new CG. As another example, the autonomous aircraft may land and perform a second set of near-flight testing maneuvers in response to determining that weather conditions (e.g., winds) have changed since taking off for a flight plan. In such circumstances, the capabilities of the autonomous aircraft may change, which may require that the flight plan be reassessed for the different flying conditions. In some embodiments, the autonomous aircraft may be configured to stop at various predefined locations during a flight plan in order to execute near-flight testing maneuvers. Such periodic testing may allow the autonomous aircraft to incrementally determine airworthiness and/or stability in safe conditions so that unforeseen issues affecting stability, fuel reserves, and/or other flight parameters may be identified before the autonomous aircraft experiences related failures or crashes.

Although embodiment techniques of this disclosure may be implemented with autonomous aircraft, it should be appreciated that various types of autonomous vehicles may benefit from the various techniques. In particular, ground-based autonomous vehicles, water-based autonomous vehicles, and hybrid-type vehicles may also utilize embodiment testing maneuvers to identify characteristics of their payloads, their current configurations (e.g., CG, power usage parameters, etc.), and how to improve performance during movement. For example, a ground-based autonomous truck (e.g., a smart delivery truck, etc.) may be configured to deliver a payload (e.g., a stack of boxes, packages, farm animals, etc.) to one or more destinations via various roadways. However, prior to beginning a delivery route, the autonomous truck may be configured to perform several pre-delivery maneuvers to test the payload as well as the truck's operability with the payload. For example, the autonomous truck may be configured to perform a series of quick movements going forward and backward, with hard brakes in between, in order to test how the payload shifts as well as how the truck's safety may be impacted when braking. As another example, the autonomous truck may be configured to drive a short test route before leaving on the actual delivery, providing an opportunity to obtain sensor data indicating whether the payload will shift based on the speeds and typical movements (e.g., turns, braking, etc.) that may occur during the delivery route. Based on testing data obtained during the testing maneuvers, the autonomous truck may change various travel parameters (e.g., increase speed, change the maximum amount of turning or braking that may be used at various points in the route, etc.). In a similar manner, an autonomous boat (e.g., a smart tugboat, etc.) may be configured to perform testing maneuvers prior to launching from a harbor in order to delivery passengers, freight, etc.

The embodiment techniques are unlike conventional methods that involve static pre-flight checks of aircraft. Such conventional actions are limited in their estimations of CG and stability, as the aircraft is not flying or otherwise moving, but is instead statically on the ground at the time of assessment. Further, conventional techniques may include utilizing post-take-off actions to make CG corrections during execution of a flight plan. Such mid-flight corrections are typically not adequate for properly ameliorating stability issues, and thus the aircraft may encounter reduced efficiency and safety.

The embodiment techniques differ from convention preflight checks by requiring autonomous aircraft to perform short, pre-flight mid-air routines to more accurately determine the likely stability of the aircraft once it eventually takes off for a flight plan. These near-flight testing maneuvers may be performed in conjunction with conventional preflight checks, and may enable the autonomous aircraft to obtain more accurate and robust data for determining CG and stability issues. For example, by performing maneuvers in air that test extreme movements of the autonomous aircraft (e.g., jerking movements, tilting, etc.), the autonomous aircraft may obtain sensor data that indicates how well the payload is positioned for similar such movements during an actual flight plan. In this manner, the embodiment techniques improve upon reactive conventional methods by providing proactive routines that better gauge how payloads may be positioned for flight based on near-flight simulations.

Figure 1:
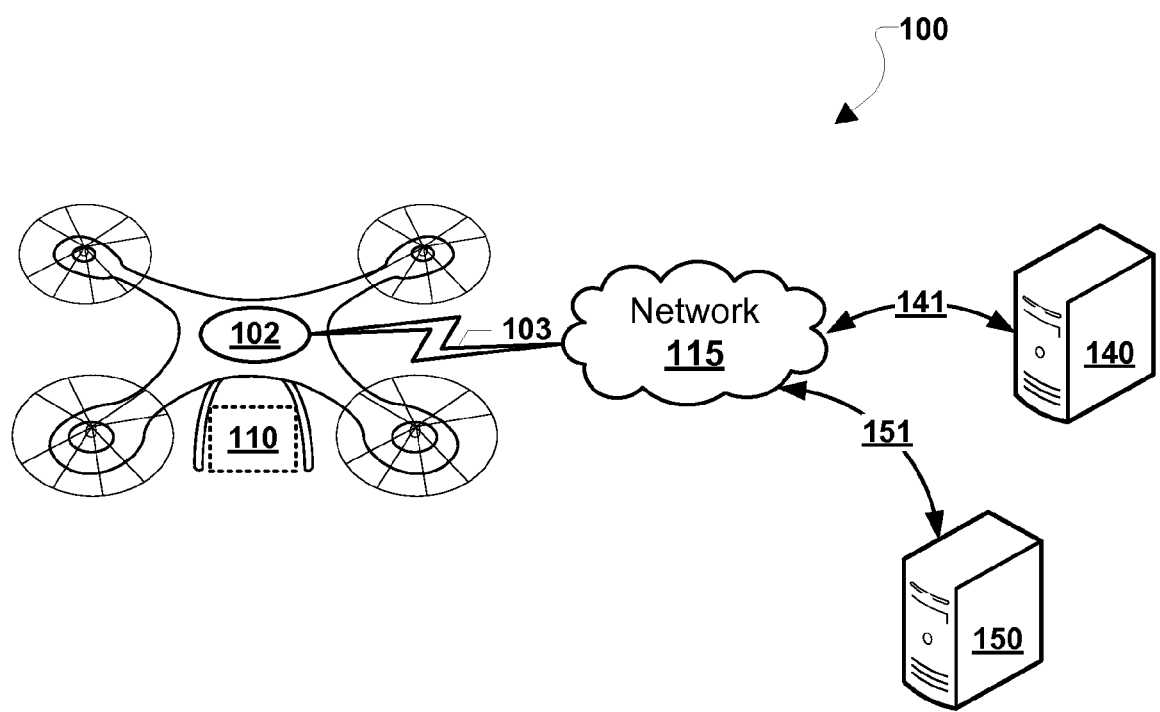
FIG. 1 is a component block diagram of a communication system including an autonomous aircraft that is suitable for use in various embodiments.

FIG. 1 illustrates a communication system 100 including an autonomous aircraft 102 that is suitable for use in various embodiments. For example, the autonomous aircraft 102 may be a "quad-copter" that utilizes a set of four independently driven rotors capable of providing adequate lift required for flight. The autonomous aircraft 102 may be configured to carry an optional payload 110, such as a box, package, loose equipment, and/or other items. For example, the autonomous aircraft 102 may include a hook, compartment, claw, bag, and/or other element capable of holding an item (e.g., parcel, groceries, mail, etc.) for aerial delivery to a remote location. In some embodiments, the autonomous aircraft 102 may be configured to independently adjust the placement and/or orientation of the payload 110, such as by using motors and belts to slide and/or turn the payload 110 on a rail system coupled to the autonomous aircraft 102.

The autonomous aircraft 102 may be configured to communicate over a network 115 via a wireless connection 103. For example, the autonomous aircraft 102 may be configured with a Wi-Fi® transceiver and antenna for communicating with other devices on a local area network (LAN) and/or remote devices accessible via a wide area network (WAN). In some embodiments, the autonomous aircraft 102 may be configured with components for wirelessly communicating via various cellular networks (e.g., Long Term Evolution (LTE), etc.), such as a cellular network transceiver and antenna. In particular, the autonomous aircraft 102 may communicate with a server 140 connected to the network 115 via the connection 141. Such a server 140 may be a control device and/or data hub configured to provide flight plan data to the autonomous aircraft 102, store and process testing data from the autonomous aircraft 102, or otherwise execute processes, routines, applications, etc. for supporting the operation of the autonomous aircraft 102. For example, the server 140 may be configured to receive user inputs from a human operator that may be communicated to the autonomous aircraft 102 via the network 115 in order to provide inputs that set or change the flight parameters (e.g., speed, power management limits, etc.) and/or flight plan (e.g., coordinates, turns, destination, etc.) used by the autonomous aircraft 102 prior to taking off with the payload 110. In some embodiments, the autonomous aircraft 102 and/or the server 140 may communicate with various other devices via the network 115. For example, a remote server 150 connected to the network 115 via the connection 151 may transmit data (e.g., weather data, wind conditions, retail data, customer information, etc.) to the server 140 and/or to the autonomous aircraft 102 for use in generating or adjusting flight plans or flight parameters used by the autonomous aircraft 102.

In some embodiments, the autonomous aircraft 102 may be configured to exchange short-range wireless signaling with nearby devices using short-range wireless communication protocols, such as Bluetooth®, ZigBee®, RF, etc., or alternatively with other short-range or line-of-sift communication techniques, such as light, sound, vibrations, etc.

Figure 2A:
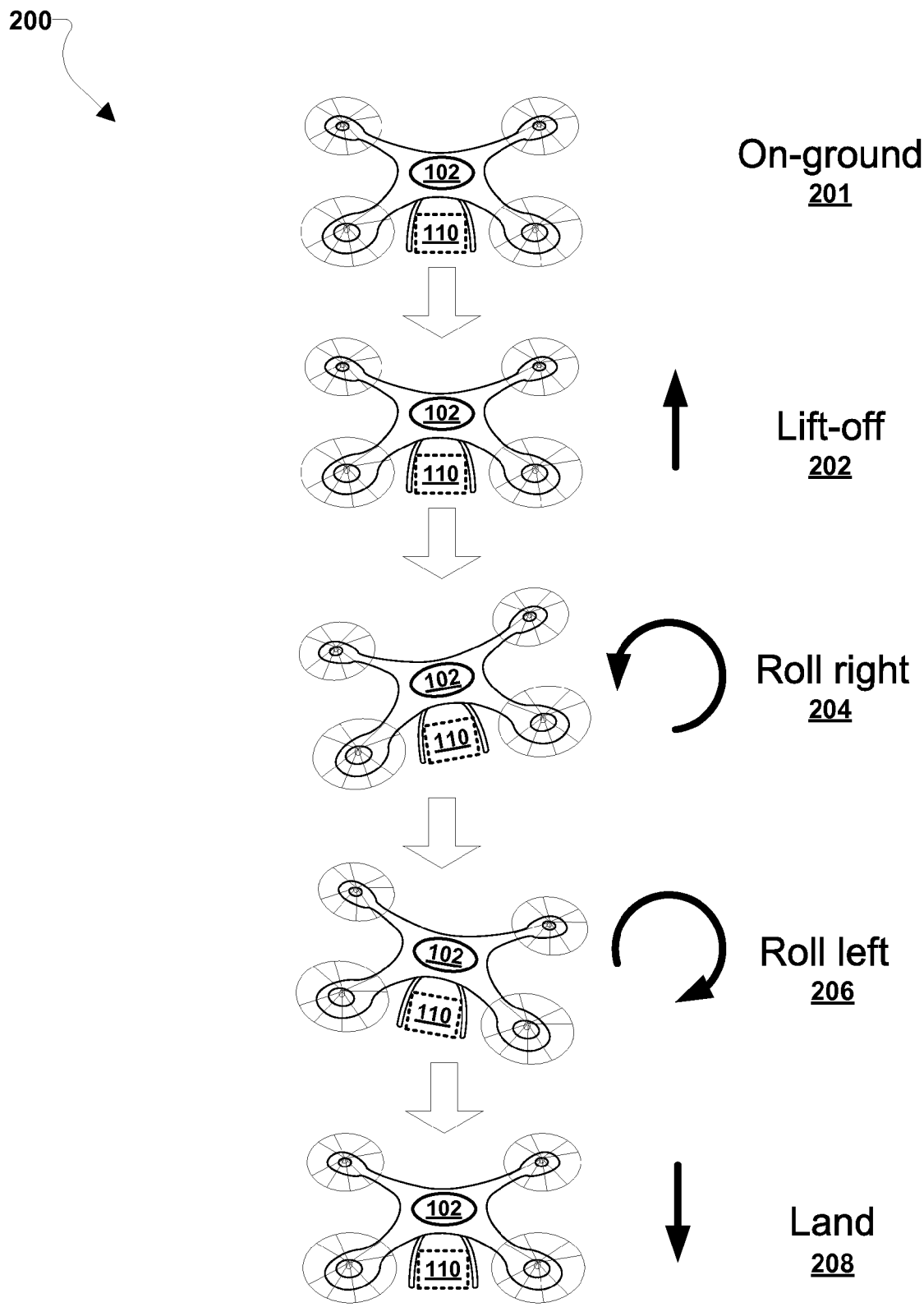
FIGS. 2A-2C are diagrams illustrating near-flight testing maneuvers that may be performed by an autonomous aircraft in accordance with various embodiments.
Figure 2B:
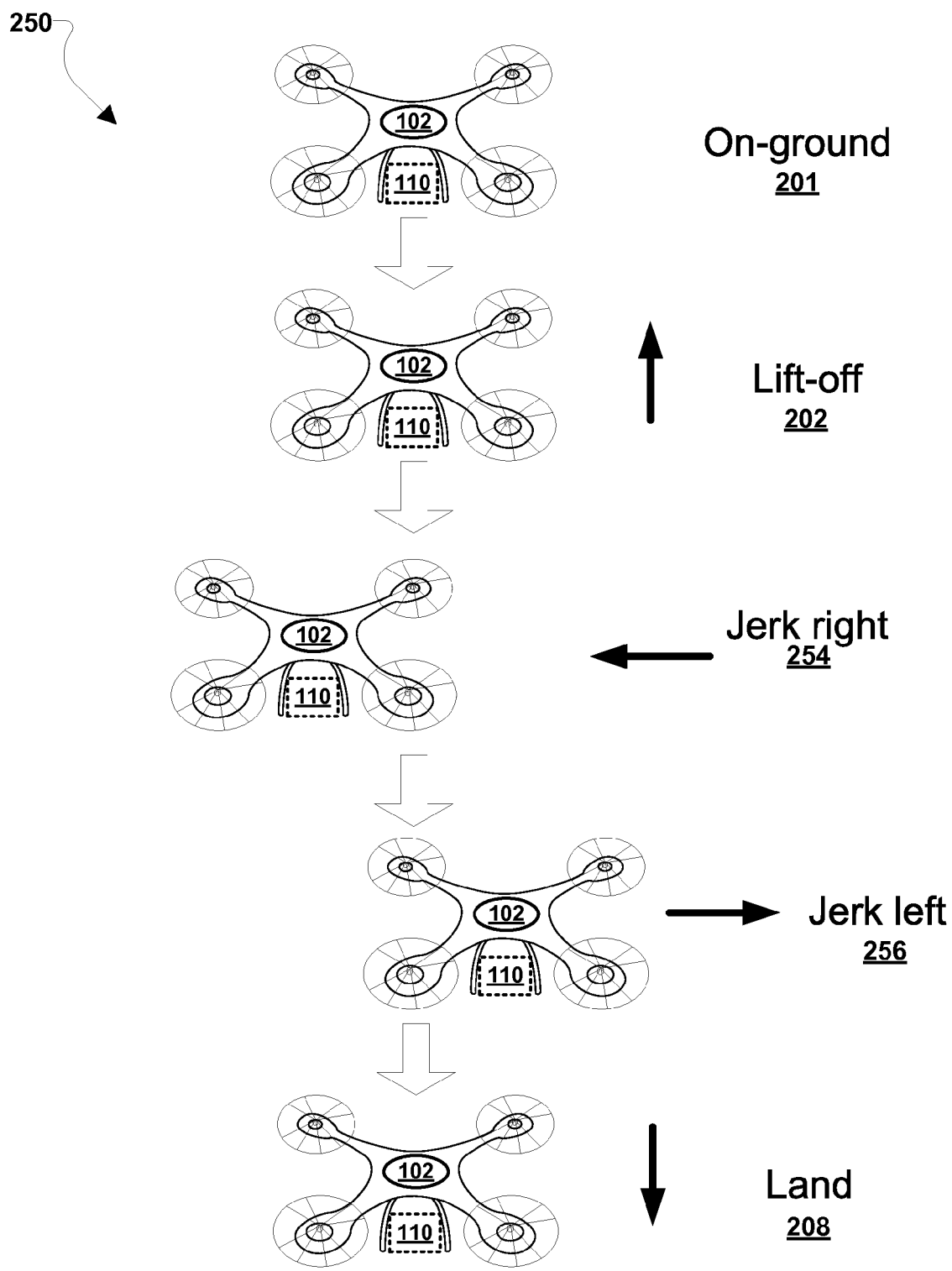
Figure 2C:
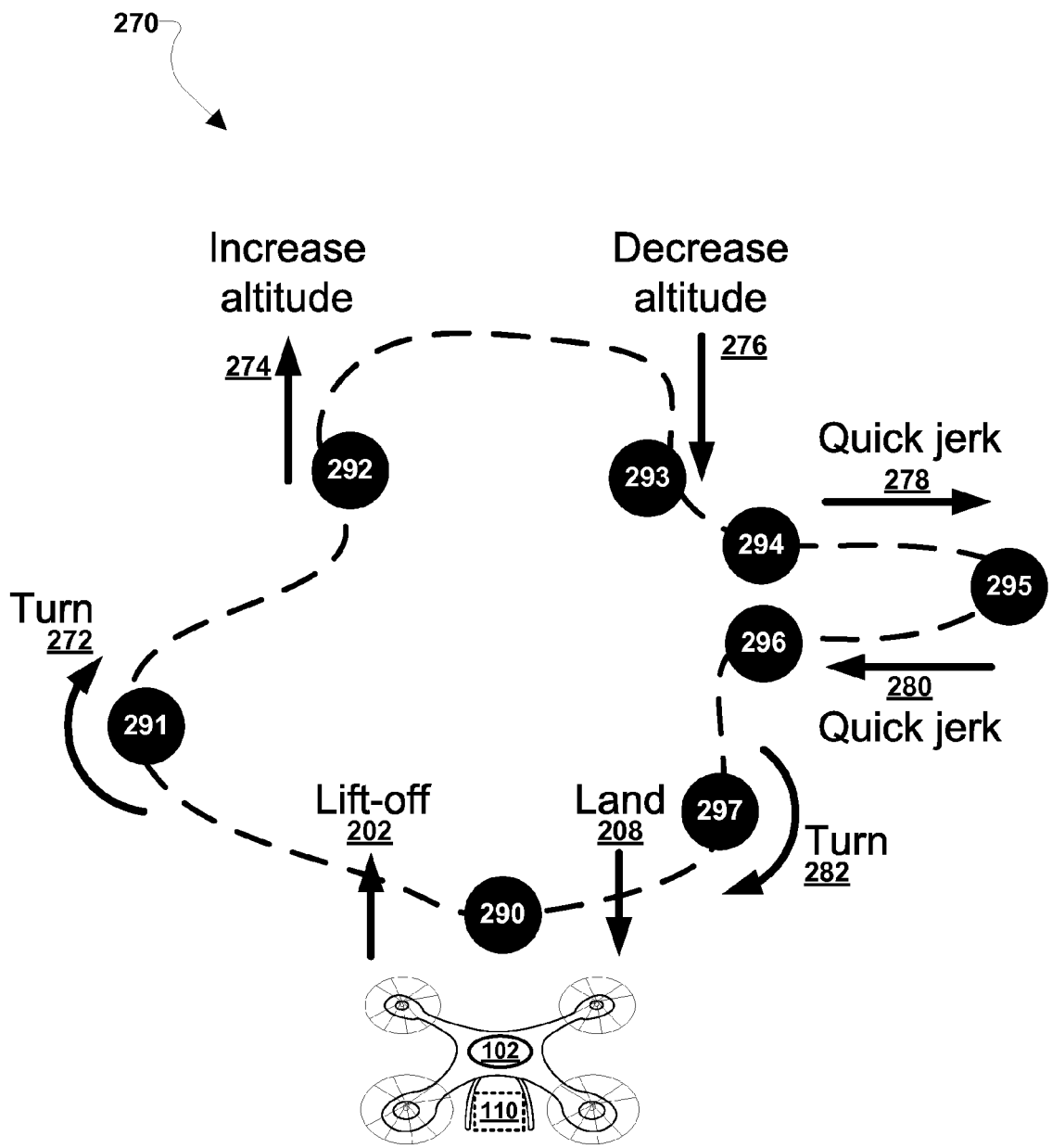

FIGS. 2A-2C illustrate exemplary near-flight testing maneuvers that may be performed by an autonomous aircraft 102 within a testing area to provide data for assessing stability according to various embodiments. For example, the exemplary near-flight testing maneuvers shown in FIGS. 2A-2C may be performed within a hangar, an airport, a warehouse, the perimeter of a helipad, and/or other testing area suitably sized to allow the autonomous aircraft to make a small lift-off and conduct various movements in mid-air to test stability of the aircraft while carrying a payload 110. Such near-flight testing maneuvers may be stored as data (e.g., instruction sets, scripts, etc.) within memory of the autonomous aircraft 102, and may be executed by a processor (e.g., the processor 630 in FIG. 6) within the autonomous aircraft 102 to control various functionalities, such as changing the power, speed, and/or other settings of motors associated with rotors of the autonomous aircraft 102. As described, the processor may perform monitoring operations (e.g., data collection and processing) before, during, and/or after the near-flight testing maneuvers are performed, such as by accessing readings from on-board sensors to determine attitude, power fluctuation, and other operating conditions that may indicate the stability of the autonomous aircraft 102 during movement with a payload 110.

The near-flight testing maneuvers shown in FIGS. 2A-2C are merely illustrative and should not be considered to limit the possible airborne maneuvers and/or sequences of airborne maneuvers that may be performed by an autonomous aircraft 102 when testing stability (e.g., stability testing with or without a payload 110). For example, although not shown in FIGS. 2A-2C, the autonomous aircraft 102 may be configured to execute near-flight testing maneuvers for rotating on any of three axes (e.g., x-axis for tilting forward or backward, y-axis for spinning right or left, and/or z-axis for tilting left or right, etc.), moving up and down after lift-off, moving in an diagonal manner, and/or any combination of these maneuvers (e.g., rotating on the x-axis while moving forward and upward, etc.). Further, although not shown in FIGS. 2A-2C, near-flight testing maneuvers may be repeatedly performed by the autonomous aircraft 102 during any testing operations, such as by performing loops of near-flight testing maneuver sequences over a period of time.

FIG. 2A illustrates a first sequence 200 of tilting near-flight testing maneuvers that may be performed by the autonomous aircraft 102. With reference to FIGS. 1-2A, initially, the autonomous aircraft 102 may be located on the ground (i.e., in an on-ground state 201). The processor of the autonomous aircraft may execute a first instruction causing the autonomous aircraft 102 to perform a lift-off maneuver 202 such that the autonomous aircraft 102 rises off of the ground a small amount (e.g., a few inches, a few feet, etc.), such as to a height from which the autonomous aircraft 102 can recover from an unstable condition by promptly landing and that will not pose a risk to humans or structures if the autonomous aircraft 102 crashes due to an instability caused by a test maneuver. The processor may execute a second instruction to cause the autonomous aircraft 102 to perform a right roll maneuver 204, such as the autonomous aircraft 102 rolling to the right. Such a roll maneuver may be a few degrees, such as to a predetermined average amount of tilt that the autonomous aircraft 102 experiences during flights. Alternatively, a roll maneuver may be more extreme (e.g., 90 degrees, etc.) than the autonomous aircraft 102 experiences in normal flight but is designed provide useful information about the autonomous aircraft's stability in extreme conditions (e.g., high wind, turbulence, etc.). Tilting (i.e., pitch or roll maneuvers) may cause a fuel medium (e.g., liquid fuel) and/or an optional payload 110 or parts of the payload to shift, such as when the payload 110 is a box containing other items (e.g., a package of golf balls, loose items, liquids, etc.).

In some embodiments, the autonomous aircraft 102 may execute such a tilt (i.e., pitch or roll maneuver) by changing the power applied to one or more of the motors controlling various rotors. For example, to roll to the right, the processor of the autonomous aircraft 102 may instruct the motor(s) on the left-hand side of the autonomous aircraft 102 to increase power, spinning the motor rotor(s) faster to cause greater lift on the left side, thus resulting in a roll to the right. In some embodiments, the processor of the autonomous aircraft 102 may instruct a motor to move ballast or other weight to the right side in order to shift the CG to the right, which may also induce a roll if the flight control system is instructed to stop maintaining level flight.

The processor may execute a third instruction causing the autonomous aircraft 102 to perform a left roll maneuver 206 such that the autonomous aircraft 102 leans to the left. The left roll maneuver 206 may be similar to the right roll maneuver 204 except in the opposite direction. For example, the processor of the autonomous aircraft 102 may instruct a motor to move ballast or another weight to the left side in order to cause the roll to the left. The processor may perform similar maneuvers to cause the autonomous aircraft 102 to pitch forwards and backwards (not shown), as well as induce a tilt in any other orientation in order to test the stability of the aircraft (with or without a payload 110) in any of a variety of orientations that the aircraft may experience in flight. Further, the first sequence 200 may also include redundant instructions such that that autonomous aircraft 102 performs some of the near-flight testing maneuvers more than once. Finally, the processor may execute a fourth instruction causing the autonomous aircraft 102 to perform a landing maneuver 208 such as returning to the starting position on the ground. In some embodiments, instead of landing as part of the near-flight procedure, the processor may proceed to execute a flight plan (i.e., without performing a landing maneuver 208), particularly if the near-flight tests indicate that the aircraft is configured appropriately to safely complete the mission assigned to the autonomous aircraft.

FIG. 2B illustrates a second sequence 250 of jerking maneuvers that may be performed by the autonomous aircraft 102 during a near-flight test procedure. With reference to FIGS. 1-2B, as described, the autonomous aircraft 102 may be located on the ground initially (i.e., in the on-ground state 201), and the processor may execute a first instruction causing the autonomous aircraft 102 to execute the lift-off maneuver 202. The processor may execute a second instruction causing the autonomous aircraft 102 to perform a jerk right maneuver 254 such that the autonomous aircraft 102 abruptly moves to the right. Such a jerking movement may not be a prolonged movement, but instead may merely be a quick movement from a hovering position in order to jostle elements of the autonomous aircraft 102, such as an optional payload 110. For example, a jerk maneuver may only move the autonomous aircraft 102 a few inches or feet. In some embodiments, the autonomous aircraft 102 may execute such a jerk maneuver by changing the power allocation to the motors controlling the various rotors and/or moving ballast.

The processor may execute a third instruction causing the autonomous aircraft 102 to perform a jerk left maneuver 256 such that the autonomous aircraft 102 abruptly moves to the left. The jerk left maneuver 256 may be similar to the jerk right maneuver 254 except mirrored in the opposite direction of movement. The processor may perform similar maneuvers to cause the autonomous aircraft 102 to perform jerk movements in other directions (not shown) in order to test the stability of the aircraft (with or without a payload 110) in any of a variety of jostling motions that the aircraft may experience in flight, such as due to turbulence or sudden gusts of wind. Further, the second sequence 250 may also include redundant instructions such that that autonomous aircraft 102 performs some of the near-flight testing maneuvers more than once. Finally, the processor may execute a fourth instruction causing the autonomous aircraft 102 to execute a landing maneuver 208, such as by returning to the original position on the ground. In some embodiments, instead of landing as part of the near-flight procedure, the processor may proceed to execute a flight plan (i.e., without performing a landing maneuver 208), particularly if the near-flight tests indicate that the aircraft is configured appropriately to safely complete the mission assigned to the autonomous aircraft.

FIG. 2C illustrates a third sequence 270 of near-flight testing maneuvers including tilting, jerking and traversing a short test flight path that may be performed by the autonomous aircraft 102 as part of a testing routine according to some embodiments. With reference to FIGS. 1-2C, for example, the processor may be configured to direct the autonomous aircraft 102 to perform a lift-off maneuver 202 at a first location 290, move to a second location 291 to perform a turn maneuver 272, move to a third location 292 to perform an upward maneuver 274 that increases altitude, move to a fourth location 293 to perform a downward maneuver 276 that decreases altitude, move to a fifth location 294 to perform a first quick jerk maneuver 278 that moves the autonomous aircraft 102 to a sixth position 295, perform a second quick jerk maneuver 280 that moves the autonomous aircraft 102 to a seventh location 296, move to an eighth location 297 to perform another turn maneuver 282, and return to the first location 290 to perform a landing maneuver 208. In some embodiments, instructions defining such a testing sequence may indicate how fast the autonomous aircraft 102 should move in between the defined locations as well as any parameters for performing the various maneuvers (e.g., amount of jerk, amount of altitude increase, etc.). Again, in some embodiments, instead of landing as part of the near-flight procedure, the processor may proceed to execute a flight plan (i.e., without performing a landing maneuver 208) if the near-flight tests indicate that the aircraft (with or without an optional payload 110) is configured appropriately to safely complete the mission assigned to the autonomous aircraft.

Figure 3:
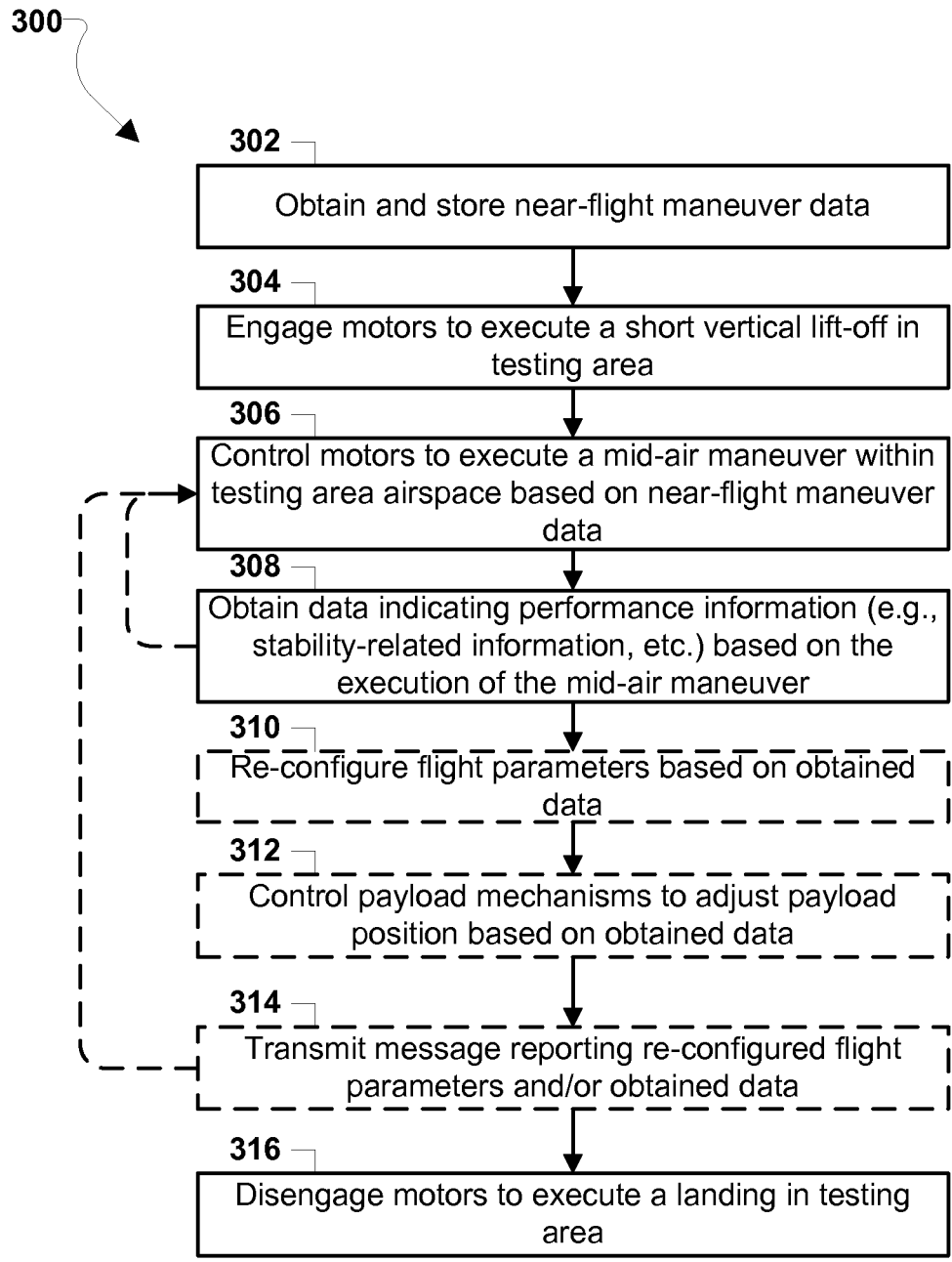
FIGS. 3-4 are process flow diagrams illustrating methods for an autonomous aircraft processor to perform near-flight testing maneuvers for improving stability in accordance with various embodiments.
Figure 6:
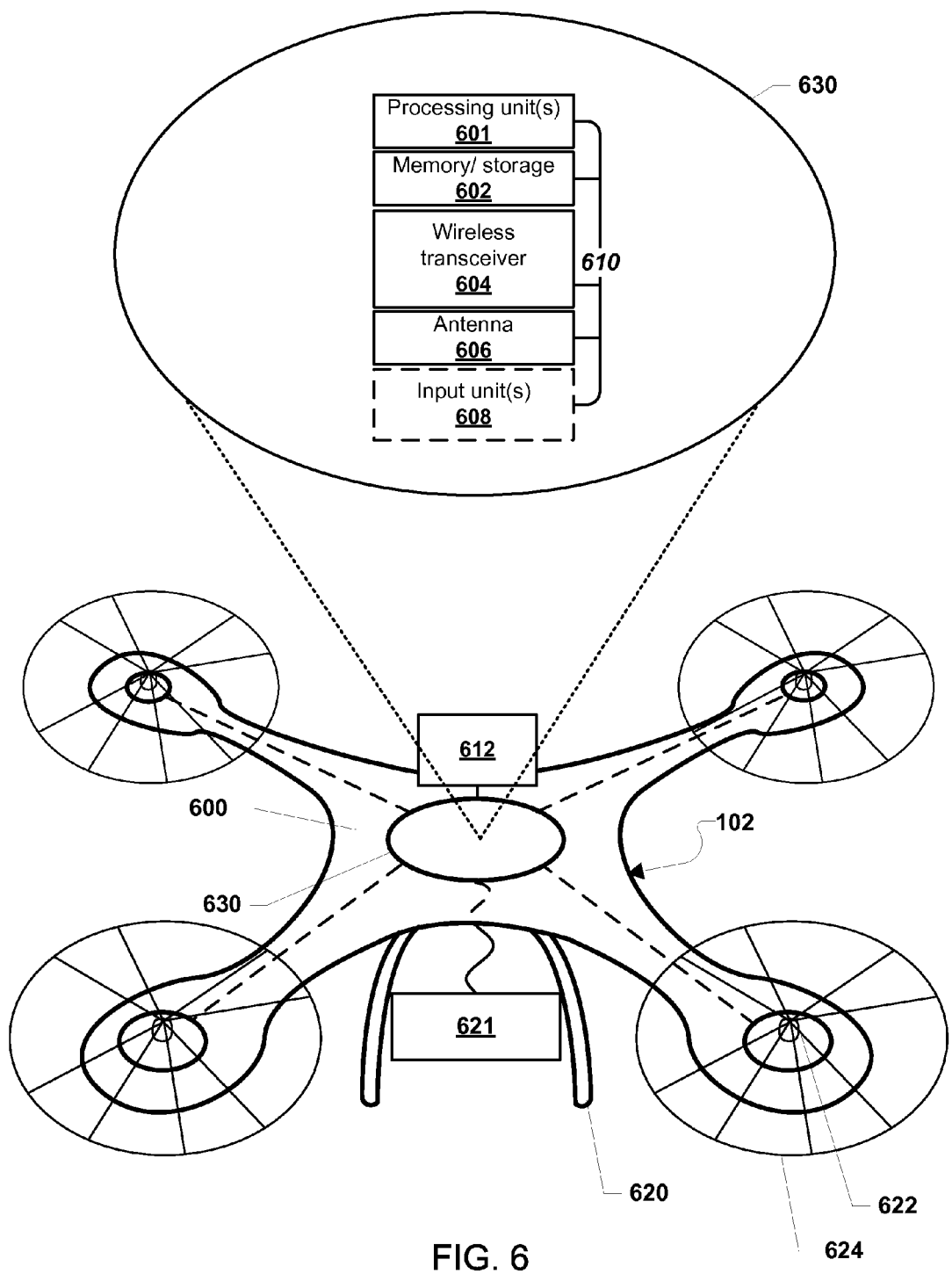
FIG. 6 is a component block diagram of an autonomous aircraft suitable for use with the various embodiments.

FIG. 3 illustrates a method 300 for performing near-flight testing maneuvers to test flight stability of an autonomous aircraft according to some embodiments. The processor of the autonomous aircraft may execute the method 300 to perform pre-defined near-flight testing maneuvers, control components of the autonomous aircraft to execute the near-flight testing maneuvers, and receive and process measurements from components (e.g., sensors, subsystems, modules, etc.) of the autonomous aircraft as a result of executing the near-flight testing maneuvers. For example, the processor may adjust various parameters of the autonomous aircraft in order to accommodate stability issues determined during the near-flight testing maneuvers, such as causing a payload to be shifted via an actuator and/or adjusting the power applied to one or more rotor motors. The processor may be any computing device embedded within, connected to, or otherwise in communication with the autonomous aircraft such that the processor may transmit commands for controlling the various mechanical, electrical, and logical functionalities of the autonomous aircraft. For example, the processor may be a control element within the autonomous aircraft as illustrated in FIG. 6. As another example, the processor may be a computing device (e.g., a server) in wireless communication with a control element on-board the autonomous aircraft. In some embodiments, the processor may perform the method 300 in combination with conventional preflight checks, such as by executing routines, instructions, applications, and other operations for testing the functioning of various subsystems and structures of the autonomous aircraft (e.g., fuel, sensors, landing gear, etc.).

With reference to FIGS. 1-3, in block 302 the processor may obtain and store near-flight testing maneuver instructions, such as during an initial configuration procedure, just prior to flight from a control hub or server, or during a routine software update (e.g., an over-the-air update) of the flight control software. The near-flight testing maneuver instructions may indicate a sequence of mid-air actions that may be performed by the autonomous aircraft, such as one or more of a tilt, a turn, a jerk, a change in altitude, a rotation, a shake, and traversing a test path. The near-flight testing maneuver instructions may be instruction sets, scripts, commands, and/or other data that may be stored and used by the processor to control the various functionalities of the autonomous aircraft. For example, the near-flight testing maneuver instructions may be a set of commands that may be sent at intervals to controllers of motors within the autonomous aircraft to control how the motors are engaged. The near-flight testing maneuver instructions may include configurations for the functionalities of the autonomous aircraft, such as power usage settings (e.g., rate of acceptable battery discharge, etc.), operating speeds, etc.

In some embodiments, the processor may obtain the near-flight testing maneuver instructions by retrieving the data from local or remote storage or memory, receiving the data based on a user input on a computing device (e.g., a control station) from a human operator, and/or receiving (or downloading) the near-flight testing maneuver instructions from other devices, such as a server. For example, the computing device may download the near-flight testing maneuver instructions from a server, desktop, mobile device, or other device that is used by a human operator to control or provide inputs to the autonomous aircraft. In some embodiments, the near-flight testing maneuver instructions may be related to the particular type, class, and/or structure of the autonomous aircraft. In some embodiments, the near-flight testing maneuver instructions may be based on standard flight protocols and/or regulations, such as Federal Aviation Administration (FAA) requirements or specifications for particular types of aircraft. For example, based on general safety requirements for drones, the near-flight testing maneuver instructions may include instructions for causing the autonomous aircraft to perform various rolls or tilts to ensure suitability for typical wind and/or turbulence conditions.

In block 304, the processor may engage motors of the autonomous aircraft to execute a short vertical lift-off in a testing area. For example, the processor may send signals to cause the four motors of a quad-copter autonomous aircraft to apply sufficient power to the flight rotors to cause the aircraft to lift off and then hover at an elevation appropriate for performing the near-flight testing maneuvers without endangering humans, buildings or other aircraft if the aircraft becomes unstable. The lift-off and hover may be only a few inches or feet above the ground. In some embodiments, the hovering elevation may be based on the near-flight testing maneuver instructions. For example, when the near-flight testing maneuver instructions include roll and pitch maneuvers, the processor may calculate an elevation that allows clearance for the rotor blades, a carried payload, and/or the body of the autonomous aircraft when at the maximum degree of tilt. In some embodiments, the processor may store data indicating the dimensions or characteristics of the testing area (e.g., boundaries, obstructions, ceilings, etc.) that may be used in determining the appropriate hover elevation for beginning the near-flight test maneuvers. For example, the processor may control the motors of the autonomous aircraft such that aircraft maintains sufficient clearance above the ground while avoiding striking a ceiling or other obstruction within the testing area during the maneuvers.

In block 306, the processor may control the motors of the autonomous aircraft to execute a near-flight testing maneuver within the airspace of the testing area based on the near-flight testing maneuver instructions. For example, the processor may send signals to control the motors driving the rotors of the autonomous aircraft so that the autonomous aircraft performs roll, pitch, or yaw motions or combinations of such motions (e.g., movements about the x-axis, y-axis, and/or z-axis), jerks in one or more directions (e.g., up, down, left, right, forward, backward, and combinations thereof), and/or movements through a preprogrammed flight path. Examples of such near-flight testing maneuvers are described with reference to sequences 200, 250, 270. In various embodiments, the processor may control the motors of the autonomous aircraft to cause the autonomous aircraft to execute airborne near-flight testing maneuver(s) at an elevation that will avoid damage to a human or equipment if the autonomous aircraft becomes unstable. For example, the elevation may be only a few inches or feet off the ground.

In block 308, the processor may obtain data from sensors (e.g., gyroscopes, accelerometers, rotor motor power, flight controls, etc.) providing performance information during execution of the near-flight testing maneuvers, such as stability-related information and/or airworthiness. In particular, the processor may receive and process sensor data from on-board sensors of the autonomous aircraft that indicate the level, balance, altitude, vibration, movement, and/or other physical states of the autonomous aircraft in response to the execution of the near-flight testing maneuvers. For example, the processor may receive accelerometer sensor data that indicates the autonomous aircraft is shaking or vibrating in response to executing the near-flight testing maneuvers. As another example, the processor may receive and process gyro data and/or camera imagery to identify whether the autonomous aircraft is flying level. The processor may also poll or measure power use by various functionalities of the autonomous aircraft during or in response to executing the near-flight testing maneuvers. For example, the processor may determine the amount of power applied to each of the motors associated with the autonomous aircraft's rotors in response to the near-flight testing maneuvers.

In some embodiments, the processor may obtain and record default or "control" data from the components of the autonomous aircraft prior to the execution of the near-flight testing maneuvers. Such control data may be used by the processor to compare with real-time obtained data to determine imbalances, changes in center-of-gravity, and other conditions that may be anomalous. For example, prior to lift-off and/or immediately after lift-off of block 304 but before the near-flight testing maneuvers of block 306, the processor may poll various sensors on the autonomous aircraft to obtain data indicating the aircraft's normal operating parameters (e.g., power use, balance, level, vibration, center-of-gravity, etc.).

If a payload or equipment on the autonomous aircraft is out of position such that the CG is shifted from a preferred orientation, the obtained data may indicate stability issues or may be used by the processor to perform calculations related to stability. For example, the processor may be configured to utilize data from a plurality of sensors in addition to power usage (e.g., battery efficiency) data collected by the processor to calculate a center-of-gravity (CG) or a general stability assessment of the autonomous aircraft. The processor may also perform predictions based on the obtained data, such as power use predictions for a flight plan. For example, the processor may use the obtained data indicating there is a poor weight distribution to determine whether energy stored in the batteries or fuel resources could be exhausted during a planned flight profile or mission.

In some embodiments, the processor may obtain data indicating performance of the autonomous aircraft during the execution of the near-flight testing maneuvers. In particular, the processor may obtain data that indicate the success or accuracy of navigational controls employed by the autonomous aircraft during the near-flight testing maneuvers. For example, the processor may receive measurements that indicate whether the autonomous aircraft actually flew the appropriate amount during a testing flight path. The processor may obtain imagery and/or other sensor data that may be evaluated to identify discrepancies between expected movements and actual movements. In some embodiments, the processor may periodically or during every maneuver of a testing flight plan take a picture of the horizon, a launch pad, or other frames of references that may be measured and compare with expected images. For example, the processor may take camera images of painted marks on pavement of a testing area during a testing flight, comparing the captured images of the painted marks to pre-stored images of properly (or accurately) configured autonomous aircraft in order to determine whether the new camera images indicate the autonomous aircraft was within a tolerance threshold of the proper positioning for each picture. Such accuracy/success data may indicate whether the autonomous aircraft is operating within specification and/or whether adjustments need to be made by a technician or mechanic.

In some embodiments, the processor may repeat the operations of blocks 306-308 to cause the autonomous aircraft to execute the same maneuver multiple times and/or different maneuvers within the near-flight testing maneuver instructions. For example, the processor may repeat the operations of blocks 306-308 until all distinct maneuvers indicated in the near-flight testing maneuver instructions are executed by the autonomous aircraft. As another example, the processor may repeat the operations of blocks 306-308 for a predefined number of iterations indicated in the near-flight testing maneuver instructions. In some embodiments, the processor may cause the autonomous aircraft to execute a short traversal of a test path within the testing area based on multiple executions of the operations of blocks 306-308 using the near-flight testing maneuver instructions. For example and as discussed with respect to the sequence 270, the processor may procedurally send signals to the autonomous aircraft motors causing a sequence of turns, jerks, movements, and other maneuvers to be executed at different locations within the testing area.

The processor may perform various actions based on and in response to the obtained data. Optional blocks 310-314 illustrate exemplary actions that may be executed in a responsive manner to the processor obtaining and evaluating such data associated with the near-flight testing maneuvers. In particular, the processor may re-configure flight parameters based on the obtained data in optional block 310, such as by adjusting configurations for the speed, altitude, route complexity, and/or power usage of the autonomous aircraft. For example, based on CG calculations made by the processor using obtained gyroscope sensor data and applied power data, the processor may calculate that the autonomous aircraft should operate at a decreased speed while carrying the payload in order to more efficiently or safely execute flight plans. As another example, in response to calculating that the autonomous aircraft is very stable based on received sensor data, the processor may configure the autonomous aircraft to use a higher travel speed, a higher altitude, and/or utilize a greater number of maneuvers in flight plans.

In some embodiments, the processor may adjust power use parameters for individual motors within the autonomous aircraft based on the obtained data. For example, in response to determining that the autonomous aircraft is not flying level, the processor may adjust power use settings for a particular motor to cause a greater amount of power to be consumed in order to improve balance of the aircraft.

In some embodiments, the processor may adjust power usage allowable during a flight plan, such as by setting an upper bounds for an acceptable amount of battery discharge or fuel consumption for a period of time during the flight plan. For example, the processor may set a variable to determine the battery efficiency (or fuel consumption) that is acceptable or allowable during a flight plan so that the autonomous aircraft may perform assigned duties without reaching a hazardously low level of power available. Other flight parameters may be re-configured based on such power usage configurations. For example, based on a newly configured maximum allowable power draw, the processor may adjust the top speed allowed during the flight plan, the number of turns (and thus invalidating certain alternative routes), and other particulars of the flight plan data.

In optional block 312, the processor may control payload mechanisms to adjust a payload position in order to reposition the CG based on the obtained data. For example, when the autonomous aircraft is configured to carry a payload (e.g., a box, package, etc.) and in response to determining that the obtained or calculated data indicates the autonomous aircraft is not flying level (or has an improper CG position) due to the current position of the payload, the processor may send a signal(s) to component(s) of the autonomous aircraft (e.g., actuators, motors, belts, etc.) to reposition ballast, a weight, the payload, and/or other functionality of the autonomous aircraft (e.g., a wing, etc.) to improve the aircraft's stability.

In optional block 314, the processor may transmit a message reporting the re-configured flight parameters and/or the obtained data to a remote computing device, such as a ground-based operator station or server monitoring operations of the autonomous aircraft. For example, in response to adjusting the payload mechanisms and/or flight parameters due to subpar stability readings, the processor may wirelessly transmit a message to an operator's computing device that indicates the adjustments that have been made. As another example, the processor may transmit the obtained data to a remote server for storage. As another example, the processor may transmit the obtained data to a server along with a message indicating that adjustments may be required by a human operator prior to flight. When the near-flight testing maneuvers are completed, the processor may control the motors to execute a landing in the testing area in block 316, or proceed with a flight plan (not shown).

The operations of optional blocks 310-314 are optional because the operations may not be performed when the obtained data indicates that no adjustments are required. For example, when the obtained data indicates that the autonomous aircraft is operating balanced and stable, and thus capable of performing a flight mission with a payload as configured, the processor may not be required to adjust flight parameters and/or the position of the payload. In some embodiments, the processor may be configured to perform the operations of block 306 in response to adjusting the flight parameters and/or payload mechanisms to confirm that stability has been improved for the autonomous aircraft. For example, the processor may cause the autonomous aircraft to repeat the near-flight testing maneuvers a second time to confirm whether re-configuring the power applied to a particular motor improves the stability of the aircraft.

The operations of optional block 312 may be performed when the autonomous aircraft is not configured to carry any payload for a particular flight plan or mission, such as when the autonomous aircraft is configured only to conduct surveillance missions or fly to a location to pick up a payload. In some embodiments, the operations of optional block 312 may be performed to move payload mechanisms to improve stability even when there is no payload, such as by shifting an arm or claw to offset an imbalance.

Figure 4:
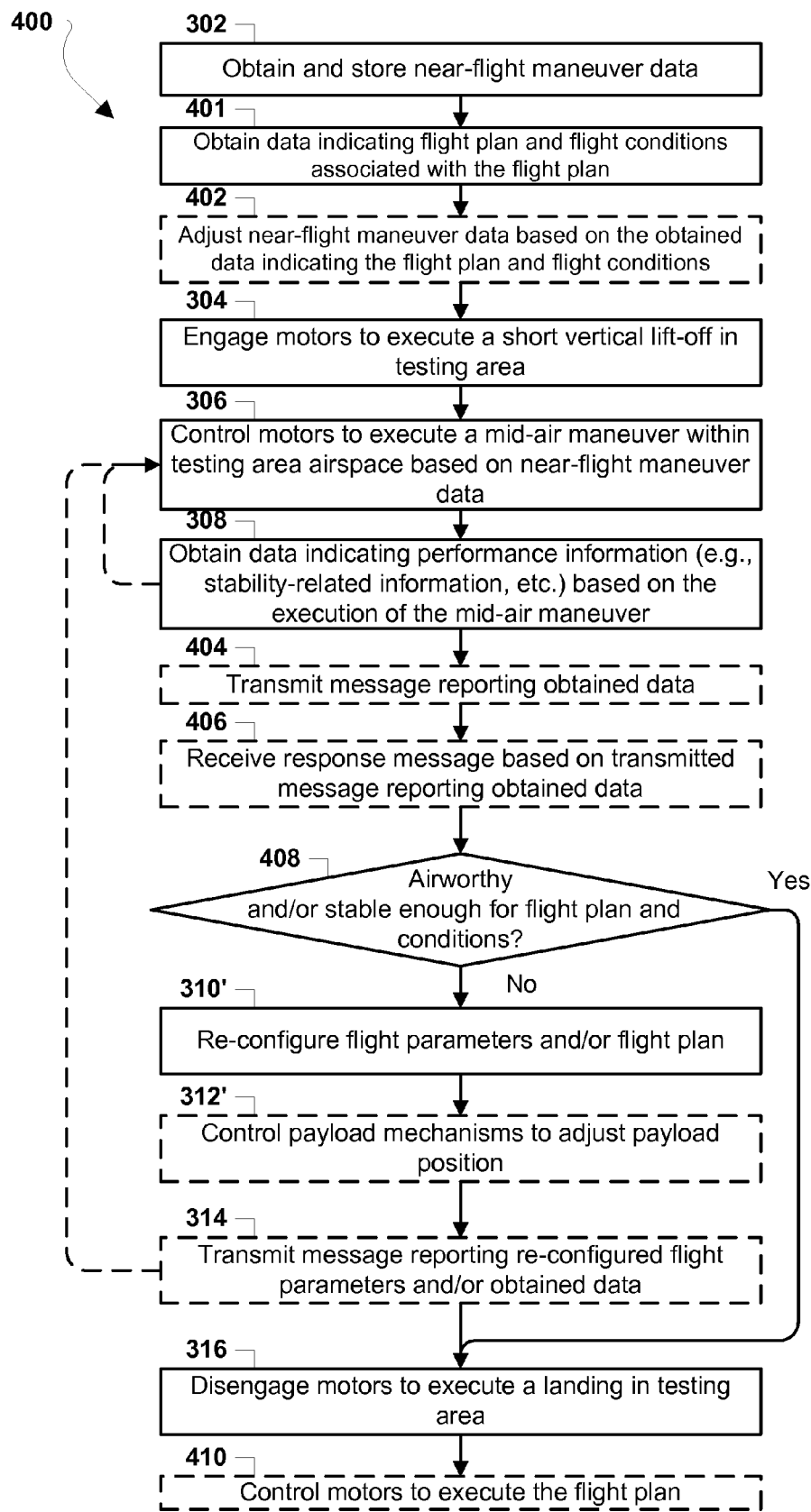

FIG. 4 illustrates a method 400 for performing near-flight testing maneuvers to test flight stability of the aircraft according to some embodiments. The method 400 is similar to the method 300 described with reference to FIG. 3, except the method 400 includes dynamic operations for determining whether the autonomous aircraft is stable for particular flight plans and/or conditions associated with a flight plan. For example, the method 400 may be performed by the processor of the autonomous aircraft to determine whether flight parameters (e.g., speed) should be adjusted prior to a predefined flight plan to deliver a payload over a destination currently having inclement weather or high winds.

With reference to FIGS. 1-4, the processor may perform the operations of block 302 as described for the like numbered block of the method 300. In block 401, the processor may obtain data indicating a flight plan and/or flight conditions associated with the flight plan. For example, the processor may download a set of instructions for flying a delivery route associated with a payload. The flight plan may include coordinates, turn lists, changes in altitude, hovers, etc., as well as flight parameters associated with various portions of the flight plan, such as airspeed or rotor configurations to use during particular segments of the flight plan. In some embodiments, the flight plan data may be similar to the structure, semantics, and/or content of the obtained near-flight testing maneuver instructions (e.g., a list of commands or a script to perform for moving the autonomous aircraft). Data indicating flight conditions associated with the flight plan may include real-time data and/or historic data indicating the weather, traffic, geography (e.g., terrain type, sea level, etc.), wind characteristics, and other information relevant to operating aircraft along the flight plan. For example, the flight conditions may indicate that there is currently or predicted to be a rainstorm along the flight route from a warehouse to a customer's house.

In some embodiments, the data indicating the flight plan may also include specific information about a payload associated with the flight plan, such as a payload type, dimensions, weight, and priority. For example, in addition to including sets of coordinates for delivering the payload to a destination address, the flight plan data may include codes or labels describing the payload type, length, width, height, whether the payload includes fragile items and/or whether the payload includes multiple shifting items within a container (e.g., balls in a box, etc.). As another example, the flight plan data may indicate that the payload is a high-priority item (e.g., urgent medical equipment, etc.).

In optional block 402, the processor may adjust the near-flight testing maneuver instructions based on the obtained flight plan data and predicted flight conditions, such as by adding, removing, and/or modifying airborne near-flight testing maneuver(s) within a sequence of airborne maneuvers to be executed prior to take-off. For example, when the flight plan requires the autonomous aircraft to fly over hills or otherwise change altitude, the processor may add data or instructions to the obtained near-flight testing maneuver instructions to include new commands for causing the autonomous aircraft to be tested with similar up and down movements to test stability under the anticipated flight conditions. As another example, when the wind conditions for the flight plan show heavy winds, the processor may add commands to the near-flight testing maneuver instructions that cause the autonomous aircraft to jerk back and forth to simulate gusts of wind. As another example, when the near-maneuver instructions includes commands for more strenuous movements than is necessary given very favorable current weather conditions, the processor may simplify the near-flight testing maneuver instructions to include less taxing maneuvers as the autonomous aircraft consistent with the flight plan and predicted flying conditions. The operations in optional block 402 may be optional as the processor may not be required to adjust the near-flight testing maneuver instructions based on the flight plan and flight conditions (i.e., the maneuvers may already be sufficient to test the autonomous aircraft). In some embodiments, the processor may automatically generate new near-flight testing maneuver instructions based on the flight plan and flight conditions, such as by ignoring the obtained standard near-flight testing maneuver instructions and replacing it with more appropriate tests given the flight plan.

The processor may perform the operations of blocks 304-308 as described for like numbered blocks with reference to the method 300. In optional block 404, the processor may transmit a message reporting the obtained data to a remote computing device, such as a ground-based operator station or a server monitoring operations of the autonomous aircraft. For example, the processor may wirelessly transmit sensor data received from on-board sensors (e.g., accelerometer, gyroscope, etc.) of the autonomous aircraft to a server for evaluation by a human operator or processing via the server. In some embodiments, the message may indicate a problem with the calculated CG of the autonomous aircraft and/or unexpected performance of the autonomous aircraft based on the near-flight testing maneuvers. For example, the message may indicate that obtained sensor data is outside of an acceptable threshold for movement based on known characteristics of the autonomous aircraft and/or a payload, and thus there may be something wrong with the aircraft and/or the payload (e.g., the contents of a box are different than expected, etc.). In some embodiments, the message may indicate a recommendation to human operators for adjusting a payload (e.g., "Payload is shifting during mid-air maneuvers. Please check packing materials," "Please move payload to the left of the aircraft to reposition CG," "Payload is moving too much for safe air travel," etc.).

In some embodiments, the transmitted message may request a response from the recipient device and/or human operator using the recipient device. In other words, the message may request permission for the autonomous aircraft to conduct the flight plan based on the near-flight test results. For example, when the obtained data based on the near-flight testing maneuvers indicates that an evaluation of the airworthiness and/or stability of the autonomous aircraft slightly is outside of a predefined tolerance or threshold, the processor may transmit a message that requests an override to commence with the flight plan. Such overrides may be requested when such thresholds are only nominally exceeded and/or when a payload or flight plan warrants an override. For example, based on data within the flight plan, the processor may determine that a high-priority payload warrants an override request. In optional block 406, the processor may receive a response message based on the transmitted message reporting the obtained data. For example, response message may be an acceptance that is sent to the processor in response to a request for an override. As another example, the response message may include a code, instruction set, a new near-flight testing maneuver instruction set, and/or other data or instructions that may be used by the processor to adjust a payload and/or the flight parameters of the autonomous aircraft.

In determination block 408, the processor may determine whether the autonomous aircraft airworthy and/or stable enough for the flight plan and the flight conditions. Such a determination may be based on the obtained data and/or the response message received in optional block 406. For example, the response message may indicate that, given the report of the obtained data, the autonomous aircraft has been approved to perform an assigned flight plan by a human operator or a mission control server. As another example, in response to identifying that the autonomous aircraft's CG is far from a preferred CG, or outside CG flight tolerances, as indicated in stored specifications data, the processor may determine that the aircraft will not be stable enough to complete the flight plan within the anticipated flight conditions. In some embodiments, the processor may compare calculated stability assessments to predefined thresholds within the flight plan to determine whether the aircraft's stability is adequate for the flight plan. For example, the processor may detect the amount of movement of the CG due to movements of the payload observed while the autonomous aircraft executed the near-flight testing maneuvers exceeds a threshold (e.g., a tolerance or stable flight envelope), and as a result may determine the flight plan may not be executed safely. In response to determining that the autonomous aircraft is airworthy and/or stable enough for the flight plan and anticipated flying conditions (i.e., determination block 408="Yes"), the processor may execute a landing in the testing area in block 316, or proceed with a flight plan (not shown) as described with reference to the method 300.

In response to determining that the autonomous aircraft is not airworthy and/or stable enough for the flight plan and anticipated flying conditions (i.e., determination block 408="No"), the processor may re-configure flight parameters and/or the flight plan in block 310', such as based on the obtained data and/or stability determinations. For example, the flight parameters may be adjusted according to instructions received from a human operator or server in optional block 404. As another example, the processor may recalculate the power distribution, output, or torque needed for various motors of the autonomous aircraft in order to safely travel the flight plan. As another example, the processor may check reported characteristics of the autonomous aircraft indicated by the obtained data (e.g., power draw of motors, throttle position, etc.) to check whether the power system of the autonomous aircraft is performing to predefined specifications, and if not, may adjust the speed to reduce the flight time for the flight plan. In some embodiments, in response to determining that the autonomous aircraft is not airworthy and/or stable enough for the flight plan and anticipated flying conditions (i.e., determination block 408="No"), the processor may simply abort a current mission related to the flight plan.

In some embodiments, the processor may re-route the flight plan based on the stability determinations and/or other factors. For example, the processor may add or remove waypoints in the flight plan to accommodate weather conditions and/or the adjusted flight parameters of the autonomous aircraft. In some embodiments, the processor may also utilize other information about the autonomous aircraft, such as average battery draw down, age on motors, etc., in order to adjust the flight parameters and/or flight plan. In some embodiments, the processor may adjust the flight plan such that a plotted path or route has an improved likelihood of success based on the determinations of the current capabilities of the autonomous aircraft. For example, the processor associated with the autonomous aircraft and/or a remote server configured to program the flight plan for the autonomous aircraft may adjust altitude and/or add, remove, and/or modify waypoints of the flight plan in order to move the autonomous aircraft through areas with fair weather that may not require actions that would endanger the safety of the autonomous aircraft. Adjustments to the flight plan may include changing one or more values of coordinates of waypoints of the flight plan. For example, in order to cause the autonomous aircraft to fly over an identified patch of bad weather, the processor may adjust the altitude (e.g., y-axis coordinate value) of a three-dimensional (3D) waypoint.

In optional block 312', the processor may control payload mechanisms to adjust a payload position, such as based on the obtained data and/or the stability determination. For example, the processor may send signals to motors or actuators to cause the payload to be moved to one side of the autonomous aircraft as instructed within a message from a human operator received in optional block 404. The operations of blocks 310'-312' may be similar to the operations of optional blocks 310-312 described with reference to the method 300, except that the flight parameters and/or payload mechanisms may be adjusted to suit the particular flight plan for the autonomous aircraft with respect to a payload. The processor may continue with the operations of blocks 314-316 as described for like numbered blocks with reference to the method 300. In some embodiments, the processor may control motors of the autonomous aircraft to execute the flight plan in optional block 410, such as by causing the autonomous aircraft to execute a take-off and travel to various waypoints defined by the flight plan data.

Various forms of computing devices may be used to communicate with a processor of an autonomous aircraft, including personal computers, mobile computing devices (e.g., smartphones, etc.), servers, laptop computers, etc., to implement the various embodiments including the embodiments described with reference to FIGS. 1-4. Such computing devices may typically include, at least, the components illustrated in FIG. 5, which illustrates an example server computing device. With reference to FIGS. 1-5, such a server computing device 140 may typically include a processor 501 coupled to volatile memory 502 and a large capacity nonvolatile memory, such as a disk drive 503. The server computing device 140 may also include a floppy disc drive, compact disc (CD) or DVD disc drive 506 coupled to the processor 501. The server computing device 140 may also include network access ports 504 (or interfaces) coupled to the processor 501 for establishing data connections with a network 505, such as the Internet and/or a local area network coupled to other system computers and servers.

The various embodiments may be implemented within a variety of autonomous aircraft, an example of which in the form of a four-rotor autonomous aircraft 102 is illustrated in FIG. 6 that is suitable for use with the various embodiments including the embodiments described with reference to FIGS. 1-4. With reference to FIGS. 1-6, the autonomous aircraft 102 may include a body 600 (i.e., fuselage, frame, etc.) that may be made out of any combination of plastic, metal, or other materials suitable for flight. The body 600 may include a processor 630 that is configured to monitor and control the various functionalities, subsystems, and/or other components of the autonomous aircraft 102. For example, the processor 630 may be configured to monitor and control various functionalities of the autonomous aircraft 102, such as any combination of modules, software, instructions, circuitry, hardware, etc. related to propulsion, navigation, power management, sensor management, and/or stability management.

The processor 630 may include one or more processing unit(s) 601, such as one or more processors configured to execute processor-executable instructions (e.g., applications, routines, scripts, instruction sets, etc.), a memory and/or storage unit 602 configured to store data (e.g., flight plans, obtained sensor data, received messages, applications, etc.), and a wireless transceiver 604 and antenna 606 for transmitting and receiving wireless signals (e.g., a Wi-Fi® radio and antenna, Bluetooth®, RF, etc.). In some embodiments, the autonomous aircraft 102 may also include components for communicating via various wide area networks, such as cellular network transceivers or chips and associated antenna (not shown). In some embodiments, the processor 630 of the autonomous aircraft 102 may further include various input units 608 for receiving data from human operators and/or for collecting data indicating various conditions relevant to the autonomous aircraft 102. For example, the input units 608 may include camera(s), microphone(s), location information functionalities (e.g., a global positioning system (GPS) receiver for receiving GPS coordinates), flight instruments (e.g., attitude indicator(s), gyroscope(s), accelerometer(s), altimeter(s), compass(es), etc.), keypad(s), etc. The various components of the processor 630 may be connected via a bus 610 or other similar circuitry.

The body 600 may include landing gear 620 of various designs and purposes, such as legs, skis, wheels, pontoons, etc. The body 600 may also include a payload mechanism 621 configured to hold, hook, grasp, envelope, and otherwise carry various payloads, such as boxes. In some embodiments, the payload mechanism 621 may include and/or be coupled to actuators, tracks, rails, ballasts, motors, and other components for adjusting the position and/or orientation of the payloads being carried by the autonomous aircraft 102. For example, the payload mechanism 621 may include a box moveably attached to a rail such that payloads within the box may be moved back and forth along the rail. The payload mechanism 621 may be coupled to the processor 630 and thus may be configured to receive configuration or adjustment instructions. For example, the payload mechanism 621 may be configured to engage a motor to reposition a payload based on instructions received from the processor 630.

The autonomous aircraft 102 may be of a helicopter design that utilizes one or more rotors 624 driven by corresponding motors 622 to provide lift-off (or take-off) as well as other aerial movements (e.g., forward progression, ascension, descending, lateral movements, tilting, rotating, etc.). The autonomous aircraft 102 may utilize various motors 622 and corresponding rotors 624 for lifting off and providing aerial propulsion. For example, the autonomous aircraft 102 may be a "quad-copter" that is equipped with four motors 622 and corresponding rotors 624. The motors 622 may be coupled to the processor 630 and thus may be configured to receive operating instructions or signals from the processor 630. For example, the motors 622 may be configured to increase rotation speed of their corresponding rotors 624, etc. based on instructions received from the processor 630. In some embodiments, the motors 622 may be independently controlled by the processor 630 such that some rotors 624 may be engaged at different speeds, using different amounts of power, and/or providing different levels of output for moving the autonomous aircraft 102. For example, motors 622 on one side of the body 600 may be configured to cause their corresponding rotors 624 to spin at a higher rotations per minute (RPM) than rotors 624 on the opposite side of the body 600 in order to balance the autonomous aircraft 102 burdened with an off-centered payload.

The body 600 may include a power source 612 that may be coupled to and configured to power the various other components of the autonomous aircraft 102. For example, the power source 612 may be a rechargeable battery for providing power to operate the motors 622, the payload mechanism 621, and/or the units of the processor 630.

The various processors described herein may be any programmable microprocessor, microcomputer or multiple processor chip or chips that can be configured by software instructions (applications) to perform a variety of functions, including the functions of the various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used merely to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of processors, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The operations of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the claims. Thus, the present invention is not intended to be limited to the embodiments shown herein but is to be accorded the widest scope consistent with the following claims and the principles and novel features disclosed herein.

What is claimed is:

1. A method for operating an autonomous aircraft, comprising:
controlling, via a processor of the autonomous aircraft, motors of the autonomous aircraft to cause the autonomous aircraft to execute an airborne near-flight testing maneuver within a testing area;
obtaining, via the processor, data indicating performance information while executing the near-flight testing maneuver; and
taking, via the processor, an action responsive to the obtained data.

2. The method of claim 1, further comprising obtaining, via the processor, near-flight testing maneuver instructions that indicate the near-flight testing maneuver to be executed by the autonomous aircraft.

3. The method of claim 2, wherein obtaining, via the processor, the near-flight testing maneuver instructions comprises downloading, via the processor, the near-flight testing maneuver instructions from a remote server.

4. The method of claim 2, wherein obtaining, via the processor, the near-flight testing maneuver instructions comprises receiving, via the processor, the near-flight testing maneuver instructions based on a user input from a human operator.

5. The method of claim 1, wherein the near-flight testing maneuver is a sequence of airborne maneuvers comprising one or more of a tilt, a turn, a jerk, a change in altitude, a rotation, a shake, or a test path.

6. The method of claim 1, wherein obtaining, via the processor, data indicating the performance information while executing the near-flight testing maneuver comprises receiving and processing, via the processor, sensor data from on-board sensors of the autonomous aircraft.

7. The method of claim 6, wherein the on-board sensors include one or more of a gyroscope, an accelerometer, a camera, and an altimeter.

8. The method of claim 1, wherein:
the autonomous aircraft is configured to carry a payload; and
taking the action responsive to the obtained data comprises controlling, via the processor, a payload mechanism to adjust a position of the payload based on the obtained data.

9. The method of claim 8, wherein controlling, via the processor, the payload mechanism to adjust the position of the payload based on the obtained data comprises sending, via the processor, a signal to a component of the autonomous aircraft to move ballast, a weight, or the payload.

10. The method of claim 1, wherein taking the action responsive to the obtained data comprises re-configuring, via the processor, a flight parameter of the autonomous aircraft based on the obtained data.

11. The method of claim 10, wherein the flight parameter is one or more of a speed, an altitude, and a power usage.

12. The method of claim 1, wherein taking the action responsive to the obtained data comprises transmitting, via the processor, a message reporting the obtained data to a remote computing device.

13. The method of claim 12, wherein the message to the remote computing device requests permission for the autonomous aircraft to conduct a flight plan.

14. The method of claim 1, further comprising:
obtaining, via the processor, data indicating a flight plan and flight conditions associated with the flight plan; and
determining, via the processor, whether the autonomous aircraft is airworthy or stable enough for the flight plan and the flight conditions based on the obtained data.

15. The method of claim 14, wherein the autonomous aircraft is configured to carry a payload, and
wherein taking the action responsive to the obtained data comprises:
re-configuring, via the processor, a flight parameter of the autonomous aircraft in response to determining that the autonomous aircraft is not airworthy or stable enough for the flight plan and the flight conditions; and
controlling, via the processor, a payload mechanism to adjust a position of the payload in response to determining that the autonomous aircraft with the payload is not airworthy or stable enough for the flight plan and the flight conditions.

16. The method of claim 14, wherein taking the action responsive to the obtained data comprises:

controlling, via the processor, the motors of the autonomous aircraft to cause the autonomous aircraft to execute a landing in response to determining that the autonomous aircraft is not airworthy or stable enough for the flight plan and the flight conditions based on the obtained data; and
controlling, via the processor, the motors of the autonomous aircraft to cause the autonomous aircraft to execute the flight plan in response to determining that the autonomous aircraft is airworthy and stable enough for the flight plan and the flight conditions based on the obtained data.

17. The method of claim 14, wherein the flight plan includes information about characteristics of a payload, wherein the characteristics include one or more of a payload type, dimensions, a weight, and a priority.

18. The method of claim 14, wherein the flight conditions include real-time data or historic data of one or more of weather, traffic, and geography.

19. The method of claim 14, further comprising adjusting, via the processor, the near-flight testing maneuver based on the obtained data indicating the flight plan and the flight conditions.

20. The method of claim 19, wherein adjusting, via the processor, the near-flight testing maneuver based on the obtained data indicating the flight plan and the flight conditions comprises adding an airborne maneuver to, removing the airborne maneuver from, or modifying the airborne maneuver within a sequence of airborne maneuvers.

21. The method of claim 14, wherein taking the action responsive to the obtained data comprises:
re-configuring, via the processor, the flight plan in response to determining that the autonomous aircraft is not airworthy or stable enough for the flight plan and the flight conditions, wherein re-configuring the flight plan comprises adding, removing, or modifying a waypoint in the flight plan.

22. The method of claim 1, wherein controlling, via the processor, the motors of the autonomous aircraft to cause the autonomous aircraft to execute the airborne near-flight testing maneuver within the testing area comprises controlling, via the processor, the motors of the autonomous aircraft to cause the autonomous aircraft to execute the airborne near-flight testing maneuver within the testing area at an elevation that will avoid damage to a human or equipment if the autonomous aircraft becomes unstable.

23. An autonomous aircraft, comprising:
a processor configured with processor-executable instructions to:
control motors of the autonomous aircraft to cause the autonomous aircraft to execute an airborne near-flight testing maneuver within a testing area;
obtain data indicating performance information while executing the near-flight testing maneuver; and
take an action responsive to the obtained data.

24. The autonomous aircraft of claim 23, wherein the processor is further configured with processor-executable instructions to obtain near-flight testing maneuver instructions that indicate the near-flight testing maneuver to be executed by the autonomous aircraft.

25. The autonomous aircraft of claim 24, wherein the processor is further configured with processor-executable instructions to obtain the near-flight testing maneuver instructions by downloading the near-flight testing maneuver instructions from a remote server.

26. The autonomous aircraft of claim 24, wherein the processor is further configured with processor-executable instructions to obtain the near-flight testing maneuver instructions comprises by receiving the near-flight testing maneuver instructions based on a user input from a human operator.

27. The autonomous aircraft of claim 23, wherein the near-flight testing maneuver is a sequence of airborne maneuvers comprising one or more of a tilt, a turn, a jerk, a change in altitude, a rotation, a shake, or a test path.

28. The autonomous aircraft of claim 23, wherein the processor is further configured with processor-executable instructions to obtain data indicating the performance information while executing the near-flight testing maneuver by receiving and processing sensor data from on-board sensors of the autonomous aircraft.

29. The autonomous aircraft of claim 28, wherein the on-board sensors include one or more of a gyroscope, an accelerometer, a camera, and an altimeter.

30. The autonomous aircraft of claim 23, wherein the autonomous aircraft is configured to carry a payload, and
wherein the processor is further configured with processor-executable instructions to take an action responsive to the obtained data to adjust a position of the payload based on the obtained data by controlling a payload mechanism.

31. The autonomous aircraft of claim 30, wherein the processor is further configured with processor-executable instructions to adjust the position of the payload by sending a signal to a component of the autonomous aircraft to move ballast, a weight, or the payload.

32. The autonomous aircraft of claim 23, wherein the processor is further configured with processor-executable instructions to perform operations such that taking the action responsive to the obtained data comprises re-configuring a flight parameter of the autonomous aircraft based on the obtained data.

33. The autonomous aircraft of claim 32, wherein the flight parameter is one or more of a speed, an altitude, and a power usage.

34. The autonomous aircraft of claim 23, wherein the processor is further configured with processor-executable instructions to perform operations such that taking the action responsive to the obtained data comprises transmitting a message reporting the obtained data to a remote computing device.

35. The autonomous aircraft of claim 34, wherein the message to the remote computing device requests permission for the autonomous aircraft to conduct a flight plan.

36. The autonomous aircraft of claim 23, wherein the processor is further configured with processor-executable instructions to perform operations further comprising:
obtaining data indicating a flight plan and flight conditions associated with the flight plan; and
determining whether the autonomous aircraft is airworthy or stable enough for the flight plan and the flight conditions based on the obtained data.

37. The autonomous aircraft of claim 36, wherein the autonomous aircraft is configured to carry a payload, and
wherein the processor is further configured with processor-executable instructions to perform operations such that taking the action responsive to the obtained data comprises:
re-configuring a flight parameter of the autonomous aircraft in response to determining that the autonomous aircraft is not airworthy or stable enough for the flight plan and the flight conditions; and
controlling a payload mechanism to adjust a position of the payload in response to determining that the autonomous aircraft with the payload is not airworthy or stable enough for the flight plan and the flight conditions.

38. The autonomous aircraft of claim 36, wherein the processor is further configured with processor-executable instructions to perform operations such that taking the action responsive to the obtained data comprises:
controlling the motors of the autonomous aircraft to cause the autonomous aircraft to execute a landing in response to determining that the autonomous aircraft is not airworthy or stable enough for the flight plan and the flight conditions based on the obtained data; and
controlling the motors of the autonomous aircraft to cause the autonomous aircraft to execute the flight plan in response to determining that the autonomous aircraft is airworthy and stable enough for the flight plan and the flight conditions based on the obtained data.

39. The autonomous aircraft of claim 36, wherein the flight plan includes information about characteristics of a payload, wherein the characteristics include one or more of a payload type, dimensions, a weight, and a priority.

40. The autonomous aircraft of claim 36, wherein the flight conditions include real-time data or historic data of one or more of weather, traffic, and geography.

41. The autonomous aircraft of claim 36, wherein the processor is further configured with processor-executable instructions to perform operations further comprising adjusting the near-flight testing maneuver based on the obtained data indicating the flight plan and the flight conditions.

42. The autonomous aircraft of claim 41, wherein the processor is further configured with processor-executable instructions to perform operations such that adjusting the near-flight testing maneuver based on the obtained data indicating the flight plan and the flight conditions comprises adding an airborne maneuver to, removing the airborne maneuver from, or modifying the airborne maneuver within a sequence of airborne maneuvers.

43. The autonomous aircraft of claim 36, wherein the processor is further configured with processor-executable instructions to perform operations such that taking the action responsive to the obtained data comprises:
re-configuring the flight plan in response to determining that the autonomous aircraft is not airworthy or stable enough for the flight plan and the flight conditions, wherein re-configuring comprises adding, removing, or modifying a waypoint in the flight plan.

44. The autonomous aircraft of claim 23, wherein the processor is further configured with processor-executable instructions to perform operations such that controlling the motors of the autonomous aircraft to cause the autonomous aircraft to execute the airborne near-flight testing maneuver within the testing area comprises controlling the motors of the autonomous aircraft to cause the autonomous aircraft to execute the airborne near-flight testing maneuver within the testing area at an elevation that will avoid damage to a human or equipment if the autonomous aircraft becomes unstable.

45. An autonomous aircraft, comprising:
means for controlling motors of the autonomous aircraft to cause the autonomous aircraft to execute an airborne near-flight testing maneuver within a testing area;
means for obtaining data indicating performance information while executing the near-flight testing maneuver; and
means for taking an action responsive to the obtained data.

46. A non-transitory processor-readable storage medium having stored thereon processor-executable instructions configured to cause a processor of an autonomous aircraft to perform operations comprising:
  controlling motors of the autonomous aircraft to cause the autonomous aircraft to execute an airborne near-flight testing maneuver within a testing area;
  obtaining data indicating performance information while executing the near-flight testing maneuver; and
  taking an action responsive to the obtained data.

* * * * *